(12) United States Patent (10) Patent No.: US 8,370,378 B2
Naito et al. (45) Date of Patent: Feb. 5, 2013

(54) DATA DISPLAY SERVER, DATA DISPLAY METHOD AND PROGRAM THEREOF

(75) Inventors: Taketo Naito, Tokyo (JP); Teruhisa Kamachi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/785,996

(22) Filed: May 24, 2010

(65) Prior Publication Data

US 2010/0235364 A1 Sep. 16, 2010

Related U.S. Application Data

(63) Continuation of application No. 11/028,584, filed on Jan. 5, 2005, now Pat. No. 7,734,650.

(30) Foreign Application Priority Data

Jan. 7, 2004 (JP) ................................. 2004-002072

(51) Int. Cl.
 *G06F 15/16* (2006.01)
 *G06F 17/20* (2006.01)
(52) U.S. Cl. ........................................ 707/767; 707/944
(58) Field of Classification Search .................. 707/767, 707/944
 See application file for complete search history.

(56) References Cited

U.S. PATENT DOCUMENTS

| | | | |
|---|---|---|---|
| 6,434,568 B1 | 8/2002 | Bowman-Amuah | |
| 6,493,703 B1 * | 12/2002 | Knight et al. .......................... | 1/1 |
| 2002/0010625 A1 * | 1/2002 | Smith et al. ..................... | 705/14 |
| 2002/0062368 A1 | 5/2002 | Holtzman et al. | |
| 2002/0184210 A1 * | 12/2002 | Khan ................................ | 707/6 |
| 2003/0028441 A1 | 2/2003 | Barsness et al. | |
| 2003/0167213 A1 * | 9/2003 | Jammes et al. ................. | 705/27 |

\* cited by examiner

*Primary Examiner* — John E Breene
*Assistant Examiner* — Alex Gofman
(74) *Attorney, Agent, or Firm* — Oblon, Spivak, McClelland, Maier & Neustadt, L.L.P.

(57) ABSTRACT

The present invention relates to recommendation of items to a user for providing items more satisfying a user's request on the basis of new association. The present invention provides a data display server connected to a user terminal, which includes a posting database for storing posting data posted through the user terminal, a reference data base for storing reference data, relational metadata generating means which generates relational metadata making association between two pieces of reference data, and a relational database for storing the relational metadata. According to the arrangement, tight linking between reference data is made possible so that items more suitable for a user's preference can be recommended.

10 Claims, 22 Drawing Sheets

| | |
|---|---|
| POSTING ID | ~180 |
| PARENT POSTING ID | ~182 |
| USER NAME | ~184 |
| POSTING DATE/TIME | ~186 |
| TITLE ~188 | |
| TEXT ~190 | |
| REFERENCE DATA ID | ~192 |

F I G. 7
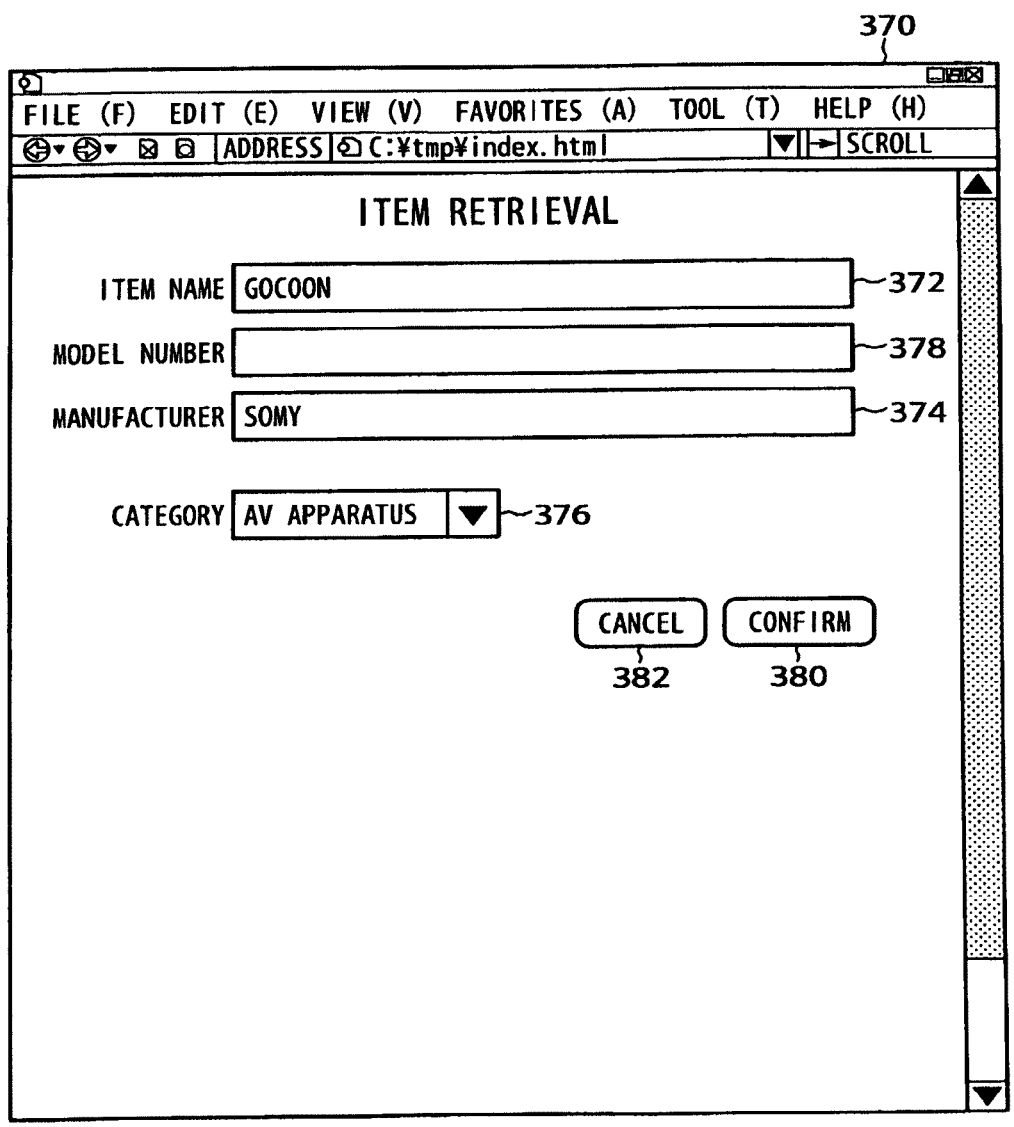

FIG. 16

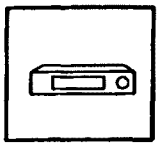

DATA DISPLAY SERVER, DATA DISPLAY METHOD AND PROGRAM THEREOF

CROSS REFERENCES TO RELATED APPLICATIONS

This application is a continuation of U.S. application Ser. No. 11/028,584, filed Jan. 5, 2005, which is based on Japanese Priority Document JP 2004-002072, filed in the Japanese Patent Office on Jan. 7, 2004, the entire contents of each of which are being incorporated herein by reference.

BACKGROUND OF THE INVENTION

1. Field of the Invention

The present invention relates to a data display server that performs a display of prescribed data by taking advantage of an inter-data relevancy, and also a data display method and a program thereof.

2. Description of Related Art

In nowadays, an information providing system available over an Internet has provided a service of a content base filtering etc. that associates similar content with each other depending on a substance of content to recommend, for a user, contents included in the associated similar content and not purchased by the user yet.

The above service requires detailed information about the content itself, and besides, a high-degree knowledge processing system capable of inferring an inter-category relevancy is separately required for a recommendation given across categories, resulting in a need to limit a range of the categories.

To avoid problems like the above, there is provided a service of a cooperative filtering etc. that associates content having been co-purchased in the past with each other based on purchase information of other users having a similar taste to recommend content not purchased by the user yet (See a non-patent document 1, for instance).

However, even a system like the above applies, to a key, merely information representing an occurrence of a co-purchase case in the past, so that there is no special relationship between the contents, resulting in a problem of a non-persuasive recommendation, that is, recommendation of little interest.

[Non-patent document 1]
"Information Recommend", [online], [Retrieved on Dec. 19, 2003], Internet<http://www-toralab.ics.nitech.ac.jp/research/past/2002/papits/InformationRecommend-e.html>

SUMMARY OF THE INVENTION

The present invention has been undertaken in view of the above problems with the conventional information providing services, and is intended to provide a novel and improved data display server that is capable of creating a new association (relational metadata) by inferring an inter-reference data relationship from reference data about content and posting data sent to a bulletin board etc. that the user visits, and also a data display method and a program thereof.

Further, the present invention is also intended to provide a data display server that is capable of recommending an item more meeting a user's requirement by displaying reference data and relational data associated with the reference data, together with a reason for the relationship to the reference data, and also a data display method and a program thereof.

To solve the above problems, according to a first aspect of the present invention, there is provided a data display server connected to a user terminal to display prescribed data in response to a request through the user terminal, wherein the data display server comprises a posting database that holds posting data having been posted through the user terminal; a reference database that holds reference data specified by a reference data ID contained in the posting data; relational metadata generating means of extracting the reference data ID one by one from each posting data according to a relationship between two posting data to generate relational metadata with two extracted reference data IDs contained; a relational database that holds the generated relational metadata; and relational data juxtaposing means of juxtaposing and displaying, on a display of the user terminal in response to a reference data browsing request from the user, the reference data and relational data associated with the reference data by the relational metadata.

Hereupon, the user terminal and the data display server include a personal computer, a PDA (Personal Digital Assistant), a mobile phone and a teleconference system, and the keyword is given, on an object to be searched with a retrieval function, in words and phrases that are indicative of features of the object. Further, the reference data is allowable to contain the reference data ID, a reference data name, an alias reference data name, a model number, a manufacturer name, a category, a descriptive text, an image URL, a price and a release date.

The above data display server is mainly intended to associate the reference data with each other, that is, generate the relational metadata. When responsive posting data is generated in the form of a reply to the posting data in a bulletin board etc. that the user visits, for instance, a strong relationship based on an equal or extremely close-related subject is supposed to be created between these posting data, in which case, data (the reference data in this place) having been referred to in the above posting data each other may be also considered to bear the strong relationship with each other likewise the above posting data. A generation of the relational metadata is performed by extracting the reference data ID specified as an ID of the above reference data from each posting data one by one, and by associating the two extracted reference data IDs with each other.

The relational metadata is stored after being generated through an inter-user information interchange of the posting data having been posted by the user and the responsive posting data etc. generated in response to the posting data. The above relational metadata may provide a prescribed association for each independently referred-to reference data, and a centralized management of the above association may be performed with the relational database independent of the reference database. As described above, the inter-user information interchange causes the inter-reference data association to be performed automatically, and ensures that a stronger association having been not available heretofore is defined.

The above relational data juxtaposing means enables the reference data that the user desires and the relational data associated with the reference data to be referred to at a time. Further, it may well be that the relational data matches information useful to the user, leading to a larger extent of information that the user can refer.

Further, the above relational data juxtaposing means is capable of being used at the time when, with reference to all the displays adapted to the display of the reference data at a retrieval time etc., an attempt is made to confirm product information of the displayed reference data, leading to a recommendation of different relational data every presentation of the information of the reference data.

The relational metadata is also allowable to be generated depending on relations in a way to use the reference data, a function, an effect, a combination, a similarity and a purchase history etc.

Just as almost questions are settled with FAQ on a web server, there are some cases where the user may solve the problem merely by viewing the relational data, provided that the above relational data is generated from a relationship of answers to user questions (the above relationship in the combination), for instance. Further, if the relationship in the similarity is available, a larger choice is also supposed to be obtainable by referring to items similar to a certain item being under examination of purchasing or not.

The relational metadata has a parameter on a degree of relevancy, and ensures that the degree of relevancy may be set high depending on the number of relational metadata containing the two reference data IDs equal to each other.

An approach to a definition of the above degree of relevancy makes it possible to provide information highly serviceable to the user. Hence, when the relational metadata equal in association to each other exists, the degree of relevancy of the above relational metadata is incremented, while no generation of duplicate relational metadata is caused. That is, the relational metadata is summarized.

The data display server is also allowable to further have relation counting means of counting the relational metadata containing two reference data IDs equal to each other.

The above relation counting means derives the degree of relevancy by counting the relational metadata every occurrence of the reference to the degree of relevancy. Hence, even when the equal relational metadata exists, no summarization of the relational metadata is required to leave all the relational metadata as they are. A configuration like the above enables a direct confirmation of a generation history of the relational metadata.

The relational data juxtaposing means may be also set to display the above relational data preferentially in descending order of the degree of relevancy representing how strong the relational data bears the relationship with the reference data. Alternatively, when no definition of the degree of relevancy is given, the relational data is also allowable to be displayed preferentially depending on the number of identical relational metadata.

The approach to the definition of the above degree of relevancy makes it possible to set a priority suited to usefulness to the user, leading to an arrangement of the relational data at a position easily available for the user according to the priority.

The data display server is also allowable to further have a user database containing user data specified as personal information of the user, wherein a display order of the above relational data is changed by making use of the user data.

The above user data contains a user ID, a user name, a password, a mail address, a category of interest, a retrieval history, a browse history, a posting history and a purchase history, and is further allowable to contain personal information about user attributes such as sex, age and occupation. The utilization of the above user data makes it possible to provide information suited to the user attributes. Further, the utilization of the user data in cooperation with the above relational database is also allowable to provide information more useful to the user. In addition, the information of the above posting data may be also reflected in the user data as the personal information of a user who posted the posting data. The information of the reference data attached to the posting data posted by the user is effective in characterizing the user attributes contained in the user data.

The relational data juxtaposing means may be also set to display the above relational data in an order suited to a type of relationship to the above reference data, and the type of relationship to the above reference data is allowable to include the relations in the way to use the reference data, the function, the effect, the combination, the similarity and the purchase history.

The above type of relationship permits the user to define how the reference data bear the relationship with each other, leading to a construction of the association in which a user's intention is reflected still more. Further, in a case of the display of the relational data by the relational data juxtaposing means, the displayed relational data permits the user to easily grasp how the relational data bears the relationship with the reference data.

The reference database may be also set to hold category data representing a category of the above reference data.

In a system making use of the posting data, the items and the services are supposed to be normally available as the reference data, and a frequency of use for the items and the services is also assumed to be high. In this system, the category data is also held to put the items and the services in order according to the category defined as a high-order concept of the items and the services. Thus, the items or the services that belong to the same or similar category may be judged to have the high degree of relevancy, and an addition of a certain degree of relevancy is also applicable to the items or the services that belong to the same category.

To solve the above problems, according to a second aspect of the present invention, there is also provided a data display server connected to a user terminal to display prescribed data in response to a request through the user terminal, wherein the data display server comprises a reference database that holds reference data capable of being referred to by a user; message creating means of permitting the user to create, through the user terminal, a message to be posted; keyword input means of permitting the user to input, through the user terminal, a keyword of reference data about contents of the message; reference data retrieving means of retrieving the reference data from the reference database by the keyword; reference data juxtaposing means of juxtaposing and displaying, on a display of the user terminal, one or more pieces of reference data resulting from the retrieval; reference data selecting means of permitting the user to select, through the user terminal, the reference data attached to posting data from the displayed reference data; posting means of permitting the user to post, through the user terminal, the posting data containing a reference data ID (Identification) of the reference data selected by the reference data selecting means; a posting database that holds the posting data having been posted through the user terminal; and posting browsing means of displaying, on the display of the user terminal in response to a posting data browsing request from the user, the posting data and the reference data specified by the reference data ID contained in the posting data.

Unlike the related art in which the item referred to in the posting contents is displayed in the form of a text or a URL (Uniform Resource Locator), a configuration like the above enables a direct attachment of the reference data of the referred-to item in a case of the information interchange through the bulletin board etc., so that posting authors may interchange accurate information with each other. That is, a different user who finishes reading the posted message may specify the reference data shown in the message and narrow down information to be replied. Further, the attempt of the above different user to send the reply causes a reply-sending user (which will be hereinafter also referred to as a reply user)

to attach the reference data to a responsive message, and besides, a further different user who finishes reading the posted responsive message to easily understand the contents of the above responsive message. In this manner, a mutual understanding between the users may be surely promoted.

The data display server is also allowable to further have reference data display means of displaying, on a part of a posting display of the user terminal, the reference data selected by the reference data selecting means.

A configuration like the above enables the confirmation of the reference data attached to the posting data, before the posting data is posted. Further, a retouching of the message to be posted is also permitted with reference to the detailed information of the reference data.

The data display server is also allowable to have a function of the bulletin board available for a plurality of users to carry out the information interchange over a communication network.

The bulletin board is given as a typical instance in which the information interchange is carried on with the posting data. Further, an application to a chat, a mailing list, a diary-WEB LOG Track Back, an instant message and an electronic mail etc. that are equal in function with the bulletin board is also acceptable. Furthermore, a format in which impressions, evaluations and word-to-mouth communication information are added to the reference data is also capable of being used for the present invention, provided that the reference data is specified.

The reference data attached to the responsive posting carried out in response to the above posting may also be recommended reference data for the user who posted the posting data.

Further, the reference data and the relational data may also be data of an item or service, or otherwise, metadata representing attribute information and relational information representing the relationship with different objects is also available.

There is provided not only a program that functions as the data display server through a computer, but also a data display method of displaying prescribed data in response to the request through the user terminal by making use of the data display server and the user terminal.

The user terminal and the data display server as described above may be configured in the form of a single apparatus, in which case, the user terminal may be set to perform functions of the data display server independently. Further, each database in the data display server may be also configured in the form of a respectively independent unit.

According to the present invention described above, the inter-reference data relationship is inferred from the posting data posted to the bulletin board etc. that the user visits and the reference data with regard to the content, leading to generation of the new association. Further, the relational data associated in this manner is displayed together with the reason for the relationship of the relational data to ensure that the item more meeting the user's requirement is recommended.

BRIEF DESCRIPTION OF THE DRAWINGS

FIG. 3 is a structural view showing a structure of posting data;

FIG. 7 is a view showing an item retrieval display for retrieving item data;

FIG. 16 is a view showing a bulletin board posting display on which a section of selecting a type of relationship is added;

FIG. 22 is a view showing a product information display.

DESCRIPTION OF PREFERRED EMBODIMENTS

Figure 1:
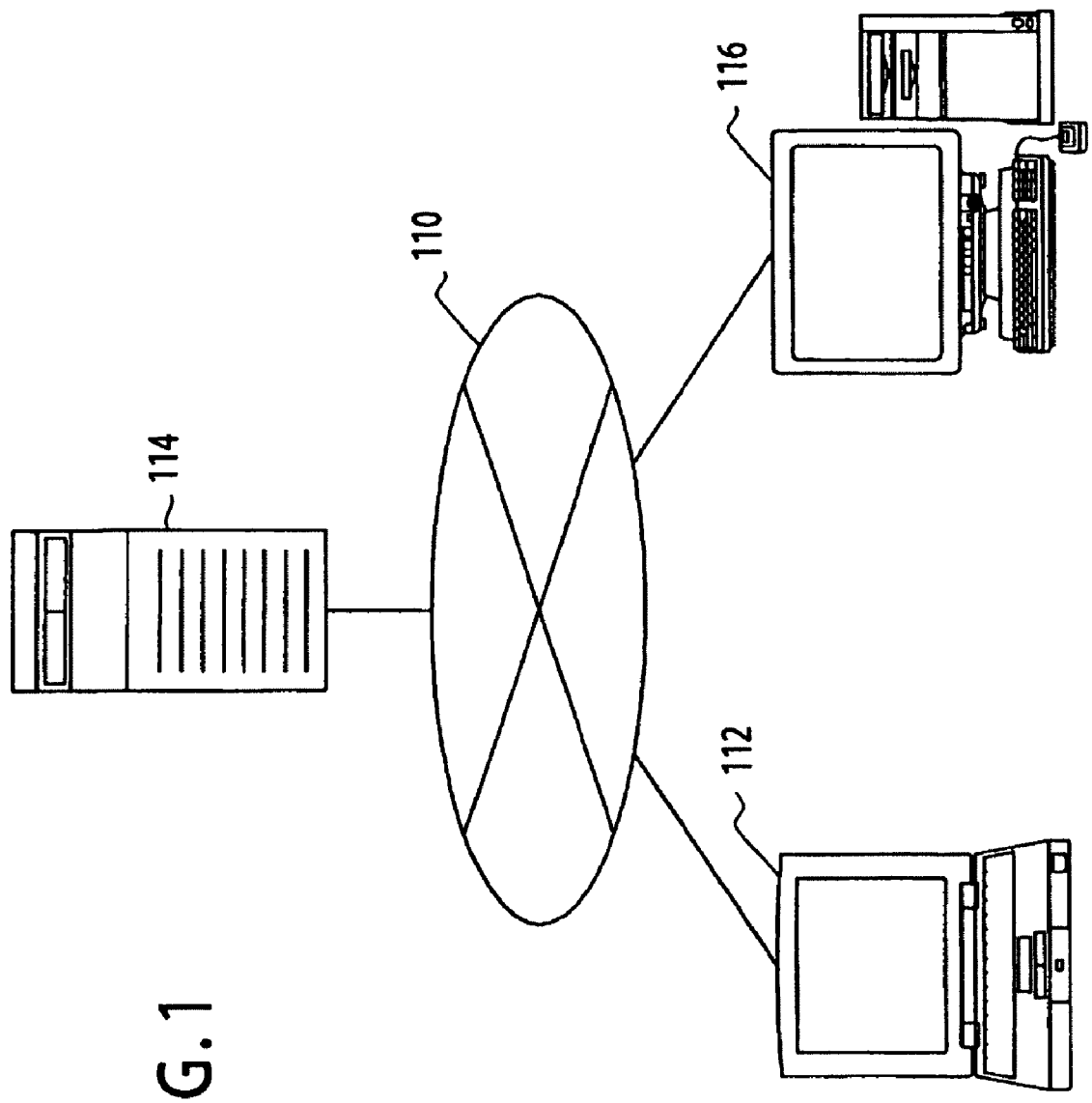
FIG. 1 is a block diagram showing an outline of a data display system in a first embodiment of the present invention.

A preferred embodiment of the present invention is hereinafter described in detail with reference to the accompanying drawings. It is noted that, in the present specification and the drawings, components having the substantially same functional configuration are given like reference numerals to omit a duplicate description.

(First Embodiment: Data Display System)

FIG. 1 is a block diagram showing an outline of a data display system in a first embodiment of the present invention. The above data display system is composed of a communication network 110, a user terminal 112 and a data display server 114. This section describes a system that creates posting data through the user terminal 112, and associates reference data with each other based on an interchange of the above posting data, that is, generates relational metadata to display prescribed data by making use of the relational metadata.

The communication network 110 includes a network of the Internet available as a public line network, for instance, and is connected to a server and each terminal through a telephone line etc.

The user terminal 112 creates the posting data posted to a bulletin board managed with the data display server 114, and sends the posting data to the data display server 114. Further, a browsing of relational data associated with the reference data may be performed through the data display server 114. That is, a recommendation service with the relational data is made possible.

The data display server 114 generates the relational metadata based on the posting data received through the user terminal 112, and recommends more persuasive relational data, as compared with earlier one, based on the relational metadata. Further, this data display server is also operated as the bulletin board to hold the posting data received through the user terminal 112 and to display the posting data therein in response to a browsing request supplied through the user terminal 112 or a different user terminal 116. The display of the data relevant to the above is given in time series to ensure that addition to the bulletin board is performed in a posting order.

With a configuration like the above, a user firstly creates the posting data through the user terminal 112. Then, an item is retrieved by giving a keyword of the item, for instance, relating to a subject being referred to in the posting data. A selection of item data available as the relevant reference data from a result of retrieval causes the selected item data to be attached to the posting data, leading to a display of the item data such as an item image together with articles of the posting data on the bulletin board. Further, when the different user terminal 116 performs the browsing of the above posting data, creates responsive posting data to the above posting data, and then sends a reply with the suitable item data attached, a prescribed relationship is created between the item data in the posting data and that in the responsive posting data.

An attachment of the item data like the above makes it possible to establish an association by placing a focus on fellow item data. The items associated with each other by a plurality of posting data are used to narrow down information or give a recommendation of the item.

The above recommendation may include one resulting from the association depending on attributes of the item, in which case, however, attribute information is required for the association, and a definition once given to a prescribed attribute causes a judgment only on the relationship of a defined attribute to be made in the following processing. Further, there is also heretofore provided a cooperative filtering that defines the users having a similar purchase history as similar users to recommend the item having been purchased in the past by the similar users, in which case, however, an occurrence of a hit item enjoying a large number of purchasers requires a vast number of similar users described the above, resulting in a difficulty in giving the recommendation meeting an intention of the present invention.

Alternatively, there is also provided a method in which the user freely assigns a keyword to an item of interest to associate with a different item, in which case, however, for a reason that the keyword is not specified, different keywords are attached to the same item, resulting in no adaptability to an automation of the inter-item association.

The data display system of the first embodiment of the present invention is not to permit the user to create the relational metadata directly, but to provide the relationship for the data display server through the selection of the item. Thus, the relational metadata is created regularly and automatically in the data display server and is used for various services such as the recommendation of the item for the user.

[Second Embodiment: Data Display Server 114]

Figure 2:
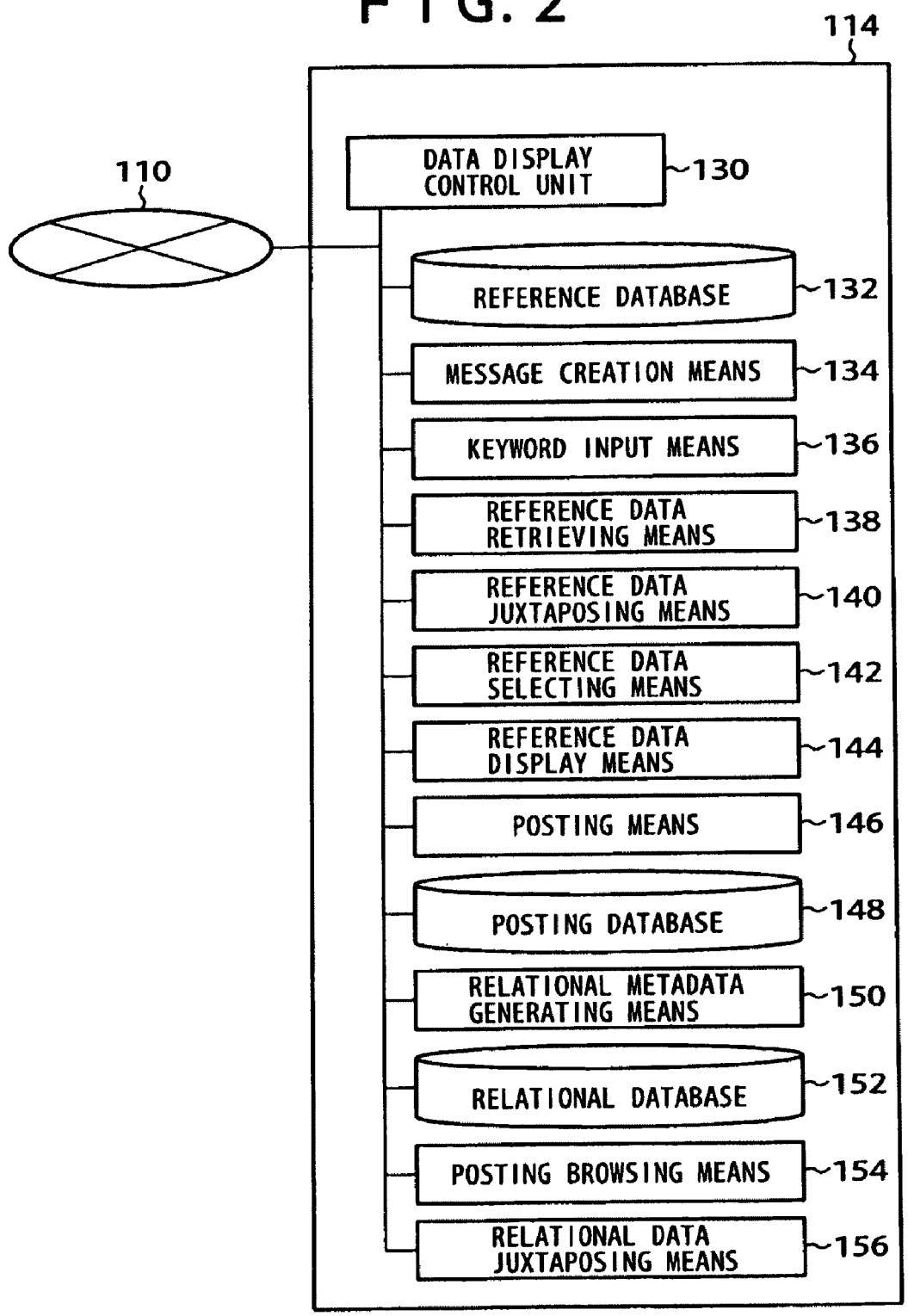
FIG. 2 is a block diagram showing a structure of a data display server.

FIG. 2 is a block diagram showing a configuration of the data display server 114 in the data display system. The above data display server 114 is intended to associate the reference data with each other, that is, generate the relational metadata, wherein the association is performed based on a concept in which the posting data adapted to the information interchange among the users would bear a strong relationship with each other.

The data display server 114 is composed of a data display control unit 130, a reference database 132, message creating means 134, keyword input means 136, reference data retrieving means 138, reference data juxtaposing means 140, reference data selecting means 142, reference data display means 144, posting means 146, a posting database 148, relational metadata generating means 150, a relational database 152, posting browsing means 154 and relational data juxtaposing means 156.

The data display control unit 130 manages and controls the data display server 114 through a control unit including a central processing unit (CPU).

The reference database 132 holds the reference data that the user can refer to. The reference data like the above is not only held in the data display server 114 of the present invention, but also linked to an external database that provides the reference data. When the item data is given as the reference data, for instance, a link to a database of a manufacturer specified as a creator of the item data may be established for a reference to details about the item data. As to the item data described the above, the above manufacturer is possessed of accurate and detailed data, while it is difficult to register and update all the above items with the data display server 114. On the contrary, when no reference data exists in the reference database 132, the user is also permitted to post the reference data to the reference database 132. However, the creation of the reference data, if being allowed for the user at will, results in a hindrance to a generation of typical and accurate reference data, so that a posting of the reference data is restricted in some degree.

The message creating means 134 permits the user to create, through the user terminal 112, a message to be posted.

The keyword input means 136 permits the user to input, through the user terminal 112, the keyword of the reference data about the contents of the above message, that is, the item data referred to in the message to specify the above referred-to item data, for instance. It is preferable that the reference data matches the item or service data.

The reference data retrieving means 138 retrieves the reference data from the reference database 132 using the above keyword. The retrieval from the reference database 132 in this manner may provide a unified retrieval result.

The reference data juxtaposing means 140 juxtaposes and displays one or more pieces of reference data resulting from the above retrieval on the display of the user terminal 112. The use of only the keyword given by the user often provides plural pieces of reference data serving as an object. Thus, the resultant plural pieces of reference data are placed in juxtaposition on the display of the user terminal 112 to cause the user to specify the reference data that fulfills the user's intention.

The reference data selecting means 142 permits the user to select the reference data to be attached to the posting data from the reference data or the relational data displayed by the reference data juxtaposing means or the relational data juxtaposing means 156. In this manner, the user is permitted to specify the reference data referred to in the message to be posted. A selection of plural pieces of reference data is also allowable.

The reference data display means 144 displays, on a part of a posting display, the reference data selected by the reference data selecting means 142. The above reference data contains a reference data ID, a reference data name, an alias reference data name, a model number, a manufacturer name, a category, a descriptive text, an image URL, a price and a release date. The user may confirm the reference data to be attached to the posting data before bringing the posting into execution.

The posting means 146 posts, to the data display server 114, the posting data containing the reference data ID of the reference data selected by the reference data selecting means 142. The posting data matches data written on the bulletin board available for a plurality of users to carry out the information interchange over the communication network.

The posting database 148 holds the posting data containing a posting message text and the reference data ID.

The relational metadata generating means 150 generates the relational metadata. The relational metadata matches metadata generated in the form of a parallel entry of a plurality of reference data IDs of the reference data referred to in the posting data by, when it is judged that there is a relationship among plural pieces of posting data to each other, associating the above referred-to reference data with each other depending on the inter-posting data relationship. Normally, the posting data to be associated is two in number, and an extraction of the reference data ID one by one from each posting data is performed, leading to the generation of the relational metadata containing the two extracted reference data IDs.

Further, the relational metadata contains a relational metadata ID, a creation date/time, an updating date/time and a degree of relevancy, in addition to the above reference data IDs. The degree of relevancy stated herein indicates how close the above relationship is, and may be given in terms of the total number of identical relational metadata. When the relational metadata given by the identical reference data ID exists, for instance, new relational metadata is not generated, while a numerical value of the degree of relevancy of the existing relational metadata is incremented.

The relational database 152 holds the above relational metadata. When the identical relational metadata exists in the relational database 152, the degree of relevancy of the relational metadata is incremented by one, while the other relational metadata is deleted from the relational database 152.

The posting browsing means 154 displays the above posting data and the reference data specified by the reference data ID contained in the posting data in response to the browsing request from the user. The user requesting browsing, that is, the user who finishes making the reference to the posting data on the bulletin board etc. may confirm also the reference data about the posting contents, together with the posting contents, leading to a more secure understanding of the posting contents.

The relational data juxtaposing means 156 juxtaposes and displays the reference data and the relational data associated with the above reference data by the relational metadata on the display of the user terminal 112 in response to the reference data browsing request from the user. The display of not only the reference data that fulfills the user's intention but also the relational data supposed to be serviceable to the user provides a larger choice for the user. Further, the relational data juxtaposing means is capable of being used at the time when, with reference to all the displays adapted to the display of the reference data at the retrieval time etc., the attempt is made to confirm the product information of the reference data, leading to the recommendation of different relational data as well every presentation of the information of the reference data. For the above reason, the relational data are arranged at a position easily available for the user in descending order of the degree of relevancy, that is, in a certain order suited to the serviceability for the user. Alternatively, the relational data is also allowable to be displayed for each type of relationship described above depending on the user's taste.

The type of relationship stated herein includes the function, the effect, the combination, the similarity and the purchase history etc. When the inter-item data relationship is defined as the reference data, for instance, items equal or similar in the function, items equal or similar in the effect, combination items having means of solving the problems of the item or meeting the intention thereof, items similar in a shape or an available purpose, or items etc. associated with each other by inferring the user's taste from the purchase history are available. It is possible for the user to define the above type of relationship in a prescribed range. The display of the above type of relationship permits the user to grasp how the relational data bears the relationship with the reference data.

Further, there is also provided a computer program that is set to function as the data display server 114 through a computer.

As described above, the inter-reference data relationship is inferred from the reference data in the posting data posted to the bulletin board etc. that the user visits to perform a management of two associated reference data by the relational metadata. The use of the relational metadata enables the relational data associated with the reference data to be displayed together with the reason for the relationship to the reference data, leading to the recommendation of the item more meeting the user's requirement.

FIG. 3 is a schematic view showing a posting data configuration. Posting data 170 is composed of a posting ID 180, a parent posting ID 182, a user name 184, a posting date/time 184, a title 188, a text 190 and a reference data ID 192.

The posting ID 180 is an ID that indicates the posting data, and the parent posting ID 182 is an ID that indicates "parent" posting data obtained when, provided that present posting data is assumed to be a reply to different posting data, the different posting data and the present posting data are respectively specified as "parent" and "child". The user name 184 indicates a name or a title of the user who posted the posting, the posting date/time 186 indicates a sending date/time of the posting data, the title 188 is a title attached to the present posting data, the text 190 is a message text created by the message creating means 134, and the reference data ID 192 is an ID of the reference data selected by the reference data selecting means 142 as the features of the second embodiment of the present invention. In this case, the selection of a plurality of reference data IDs is allowable.

[Third Embodiment: Database Structure of the Data Display Server 114]

Figure 4:
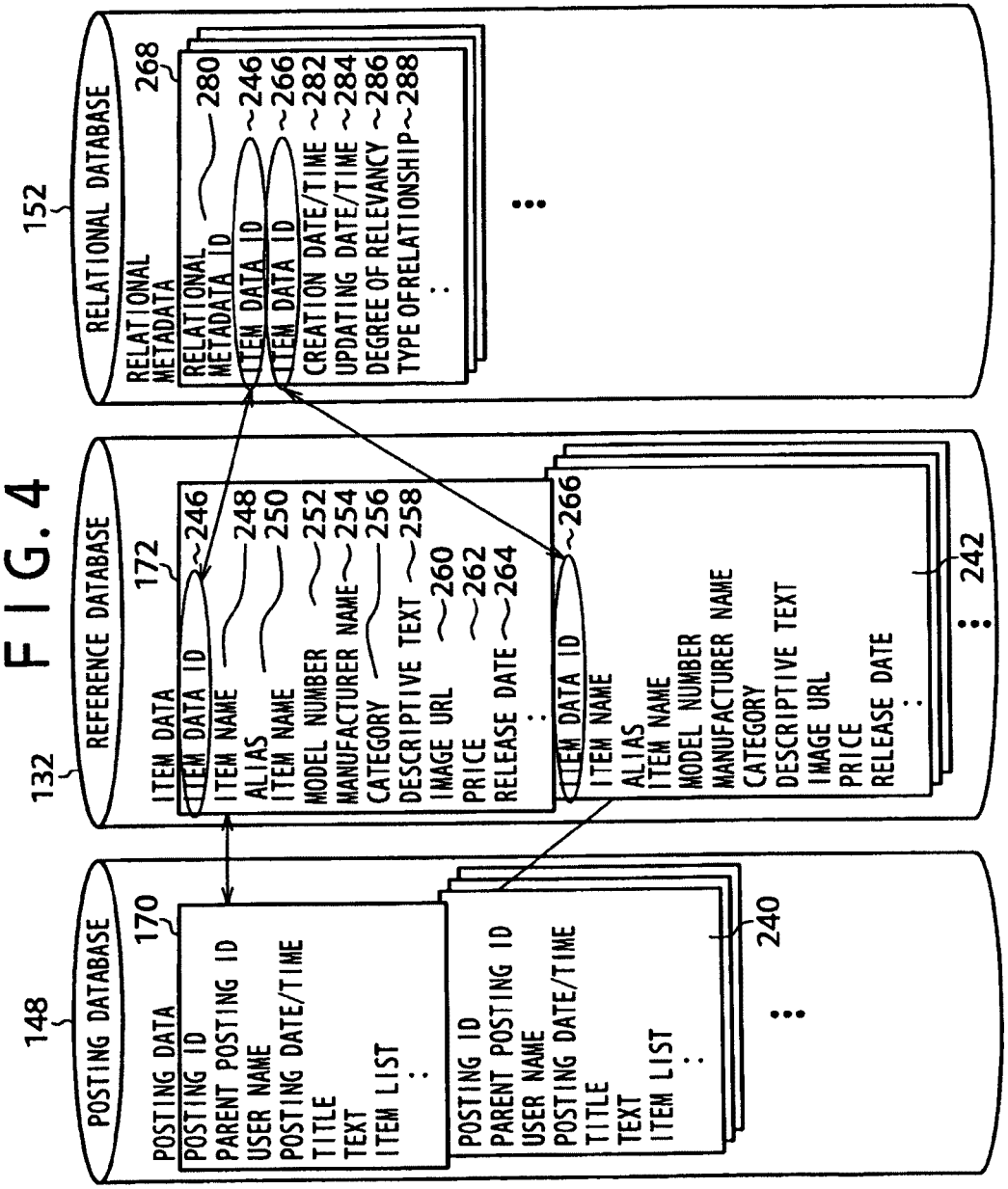
FIG. 4 is a structural view showing a structure of a database in the data display server.

FIG. 4 is a view showing a structure of the database in the data display server 114.

As described above, the database of the data display server 114 is composed of the posting database 148, the reference database 132 and the relational database 152, and these databases hold the posting data, the reference data and the relational metadata, respectively. This section gives the item data as the reference data. The relationship among data respectively held in the databases is described in the following.

The posting data 170 refers to item data 172, and posting data 240 refers to item data 242.

The item data 172 is composed of an item data ID 246, an item name 248, an alias item name 250, a model number 252, a manufacturer name 254, a category 256, a descriptive text 258, an image URL 260, a price 262 and a release date 264. The item data ID 246 is an ID of the item data, and the item name 248 indicates an official name of the item. The alias item name 250 indicates a variation of names such as abbreviations and bynames available for the retrieval of the present item, the model number 252 indicates a manufacturer model number of the item, the manufacturer name 254 indicates a name of a manufacturer and the category 256 indicates a category to which the present item belongs. The descriptive text 258 is a text containing a detailed description of the item, and the image URL 260 is a link address available for the reference to the image data. The price 262 and the release date 264 are respectively a price and a release date of the item.

The posting data 240 is an answer to a question of the posting data 170, and is thus assumed to bear the combination relationship with the posting data 170. Thus, the data display server 114 judges the posting data 170 and the posting data 240 to bear the prescribed relationship with each other, and associates the item data 172 referred to in the posting data 170 with the item data 242 referred to in the posting data 240.

The above association is established by means of separately managing the item data ID 246 of the item data 172 and the item data ID 266 of the item data 242 by different independent data. The independent data is the relational metadata 268. The relational metadata 268 contains a relational metadata ID 280, a creation date/time 282, an updating date/time 284, a degree of relevancy 286, and a type of relationship 288, in addition to the two item data IDs 246 and 266. The relational metadata ID 280 is an ID of the relational metadata, the creation date/time 282 is a first creation date/time of the present relational metadata 268, the updating date/time 284 indicates a date/time updated by a change etc. of the degree of relevancy 286, the degree of relevancy 286 is given in terms of a numerical value to indicate how close the relationship is, and the type of relationship 288 indicates the relationship in the way to use the reference data, the function, the effect, the combination, the similarity and the purchase history etc. The numerical value of the degree of relevancy 286 is incremented by one at the time when the generation of the relational data containing the item data IDs 246 and 266 equal to each other is attempted.

The relationship between the posting data 170 and the posting data 240 described above is supposed to be equivalent to a relationship of "parent" to "child", and the association established by a user's intervention like the above also provides the inter-item data association, leading to the generation of the relational metadata 268. The relational metadata is stored at any time through an establishment of the association described above.

[Fourth Embodiment: Data Display Method]

Figure 5:
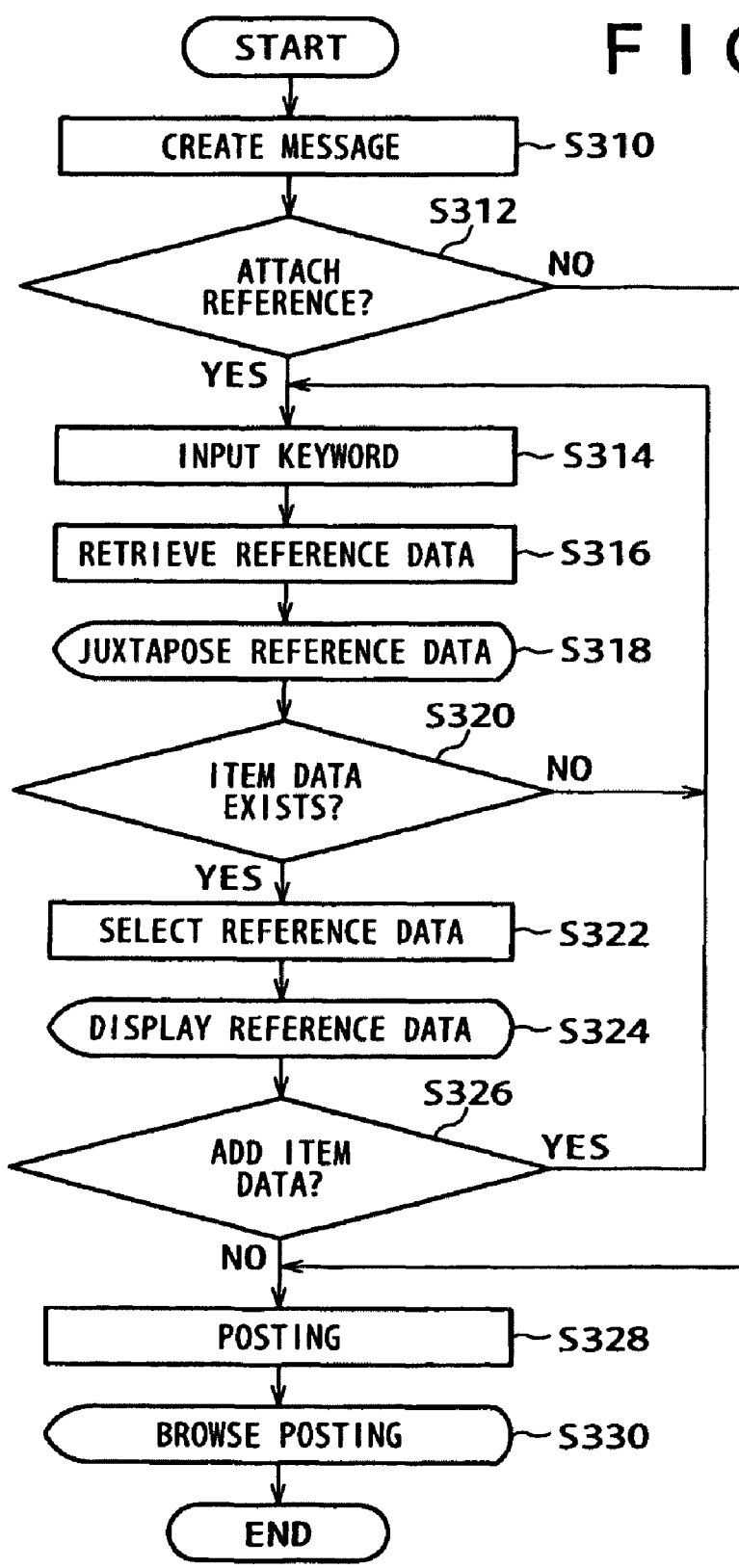
FIG. 5 is a flowchart showing a process from message creation to posting data display.

FIG. 5 is a flowchart showing a posting data generating process prior to a stage of the generation of the relational metadata, as a process contained in the data display method. The data display method according to a fourth embodiment of the present invention is described mainly with reference to the flowchart of FIG. 5. The attachment of the reference data shown in the fourth embodiment of the present invention to the inter-user posting data makes it possible to replace the relationship between the posting data by the relationship between the reference data attached to the posting data. A process of attaching the reference data to the posting data as described later promotes the generation of the relational metadata. This section gives the item data as the reference data.

First of all, a message creation step S310 is performed to permit the user to create, through the user terminal 112, a message to be posted.

Figure 6:
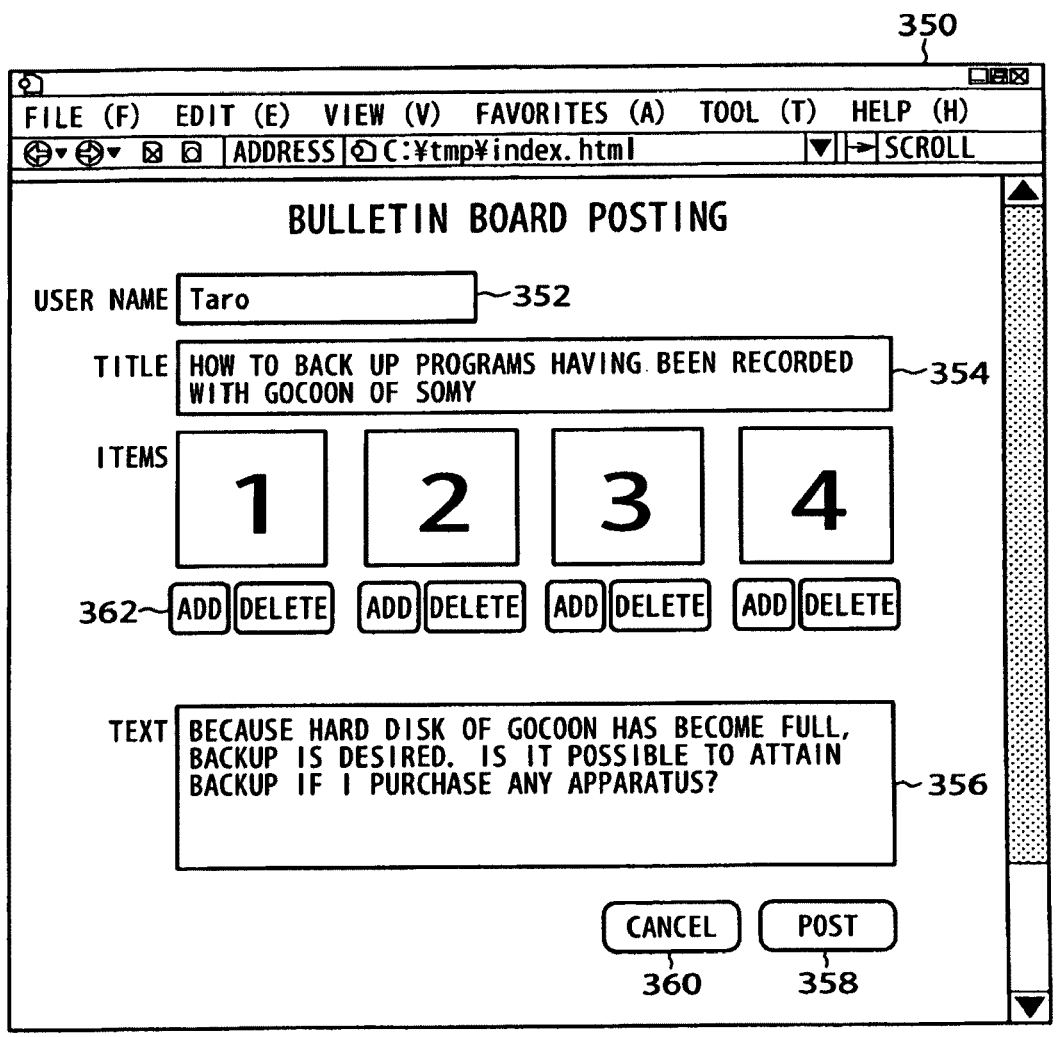
FIG. 6 is a view showing a bulletin board posting display for inputting a posting message.

FIG. 6 is a view showing a bulletin board posting display 350 available for an entry of the posting message. The bulletin board posting display 350 is provided from the data display server 114 through the user terminal 112. In the bulletin board posting display 350, it is assumed that the user who posted the posting makes entries of the user name "Taro" into a user name field 352 and a title into a title field 354 and then creates a message on a text field 356.

The user makes a choice as to whether or not the attachment of the item data being referred to in the above message to the posting data having been created in this manner is required (S312). In a case where the user requires no attachment of the item data, the posting data is formed only with the above message, leading to the posting of the posting data by a posting step S328. In the bulletin board posting display 350 of FIG. 6, a "Post" button 358 is touched when the posting is brought into execution, or a "Cancel" button 360 is touched in a case where the posting is to be canceled.

The user, in a case desiring the attachment of the item data, touches an "Add" button 362 on the bulletin board posting display 350 to retrieve the item data that fulfills the user's intention.

FIG. 7 is a view showing an item retrieval display 370 available for the retrieval of the item data. The data display server 114 performs a keyword input step S314 to permit the user to input, through the user terminal 112, the keyword of the reference data about the contents of the above message. In the item retrieval display 370 of FIG. 7, it is assumed that the attempt is made to specify the item data, provided that "AV apparatus" is selected from a category field 376 after the entries of the item name "Gocoon" into an item name field 372 and the manufacturer name "SOMY" into a manufacturer field 374. This retrieval with the keyword may leave out any uncertain keyword (a model number field 378, for instance), and the entry of more than one keyword into a single field is also allowable. Then, a "Retrieve" button 380 on the item retrieval display 370 is touched in a case where the retrieval is brought into execution, or a "Cancel" button 382 is touched in a case where the retrieval is canceled.

A touch of the "Retrieve" button 380 causes the item data to be retrieved from the reference database 132 of the data display server 114 based on the supplied keyword by a reference data retrieval step S316.

The item data having been retrieved by the reference data retrieval step S316 are juxtaposed and displayed on a retrieval result display by a reference data juxtaposing step S318.

Figure 8:
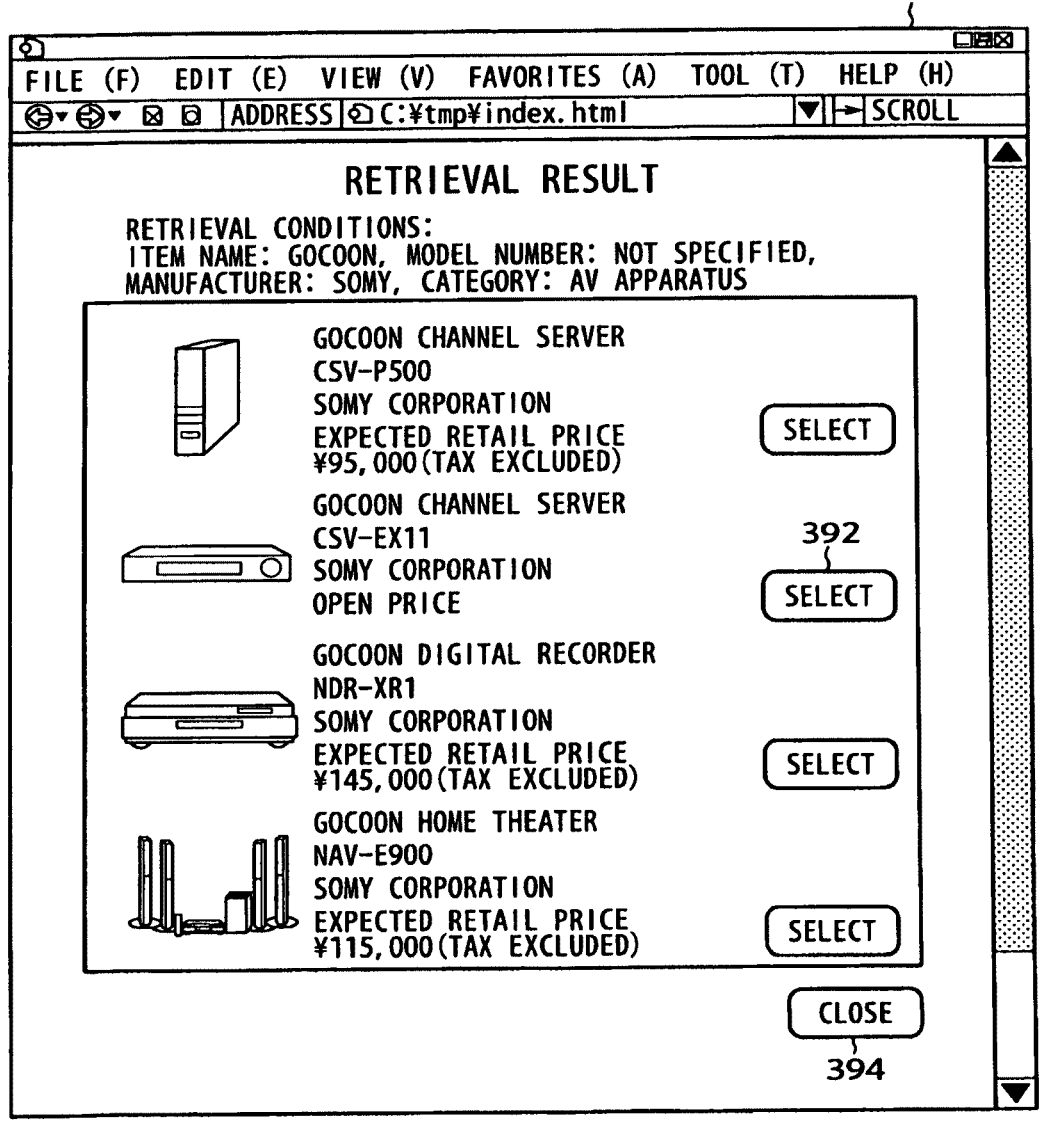
FIG. 8 is a view showing a retrieval result display.

FIG. 8 is a view showing a retrieval result display 390. In a case where, provided that the item data inferred as the relevant data from the supplied keyword are placed in juxtaposition, the item data that fulfills the user's intention is contained in the above item data (S320), a reference data selection step S322 is performed to permit the user to select the item data to be attached to the posting data from the displayed item data. In a case where no reference data is contained, a retry of the process from the keyword input step S314 is required.

In the retrieval result display 390 of FIG. 8, there are displayed four items by the reference data juxtaposing process S318. The item data that fulfills the user's intention among the above four items is assumed to be the second item data from the top, leading to the selection of this item data with the touch of a "Select" button 392. The retrieval display 390 is closed automatically following a selecting operation as described above or with the touch of a "Close" button 394.

Then, a reference data display step S324 contained in the flowchart of FIG. 5 is performed to display the selected item data on a part of the posting display.

Figure 9:
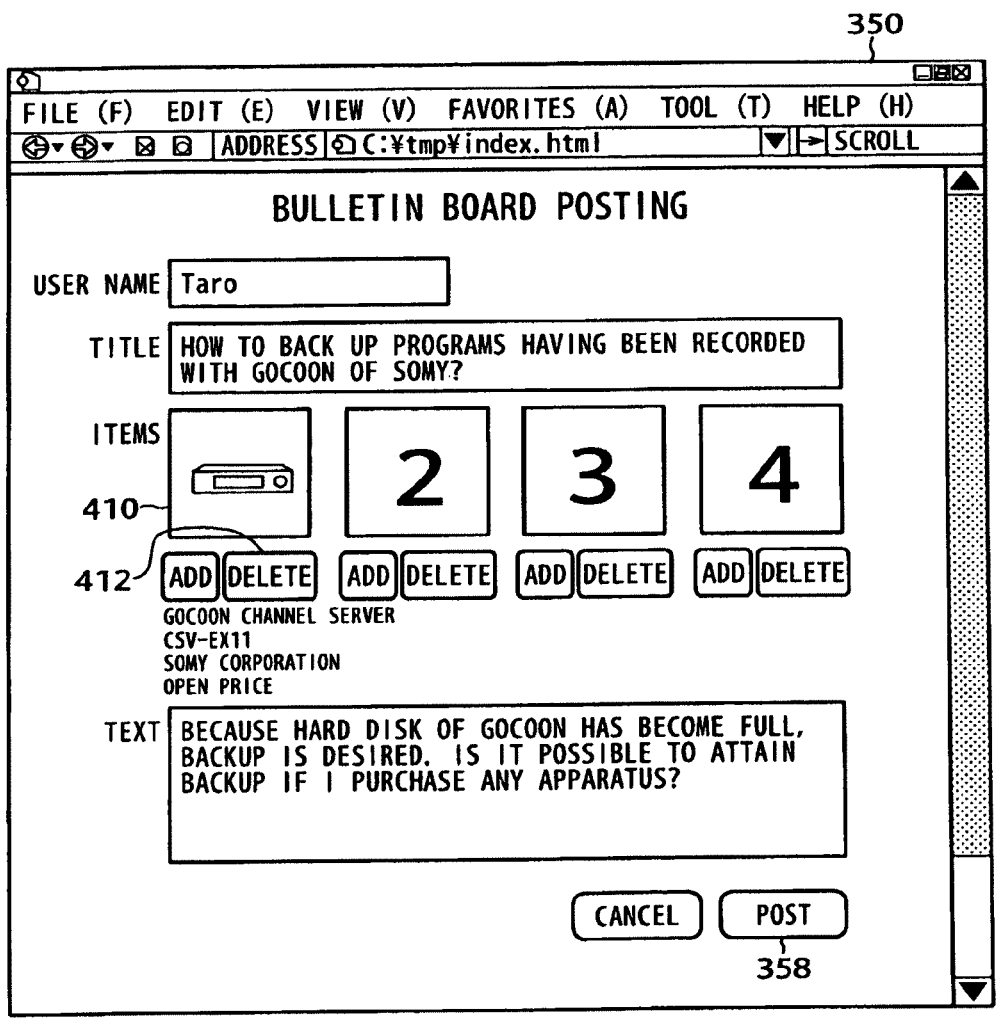
FIG. 9 is a view showing a bulletin board posting display on which the item data is displayed.

FIG. 9 is a view showing the bulletin board posting display 350 that appears with the item data displayed by the reference data display step S324. Item data 410 (exactly, the item data ID that specifies the item data 410) is supposed to be attached to the relevant posting data. In this place, a "Delete" button 412 is touched in a case where the attachment of the item data 410 is canceled.

The user makes a choice as to whether or not an addition of any other item data to the above item data 410 is required (S326), and, when no addition of any other item data is required, brings the posting into execution with the touch of the "Post" button 358 on the bulletin board posting display 350 of FIG. 9 (S328).

Then, the data display server 114 stores the above posting data in the posting database 148. When the browsing request from the user is caused by a posting browsing step S330, the display of the posting-finished posting data and the item data 410 specified by the item data ID of the posting data are performed in response to the above request.

Figure 10:
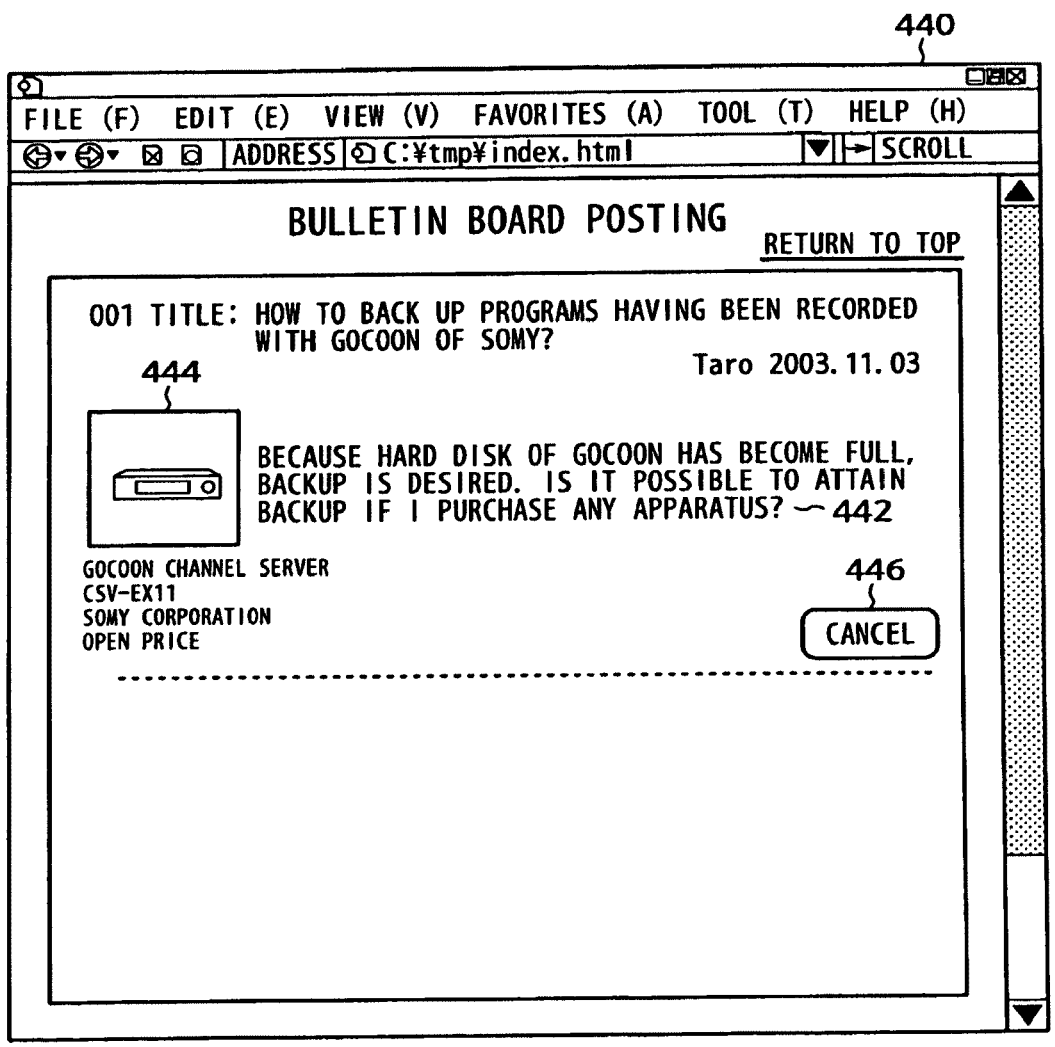
FIG. 10 is a view showing a display of posting data in the bulletin board.

FIG. 10 is a view showing the display of the posting data with a bulletin board 440. In the display of the above bulletin board, there is posted up a posting message 442 together with item data 444 of the item being referred to in the message. The different user is permitted to send a reply to this posting message by touching a "Reply" button 446.

[Fifth Embodiment: Relational Metadata Generating Process]

Sending the reply to the posting data by the different user carries out the inter-user information interchange. Further, in a case where the interchanged posting data contains the attached reference data, the reference data in the respective posting data are associated with each other, resulting in the creation of the relational metadata. In a fifth embodiment of the present invention, how to associate the reference data (the item data in the fifth embodiment of the present invention) with each other and a relational metadata generating process are described in detail.

Figure 11:
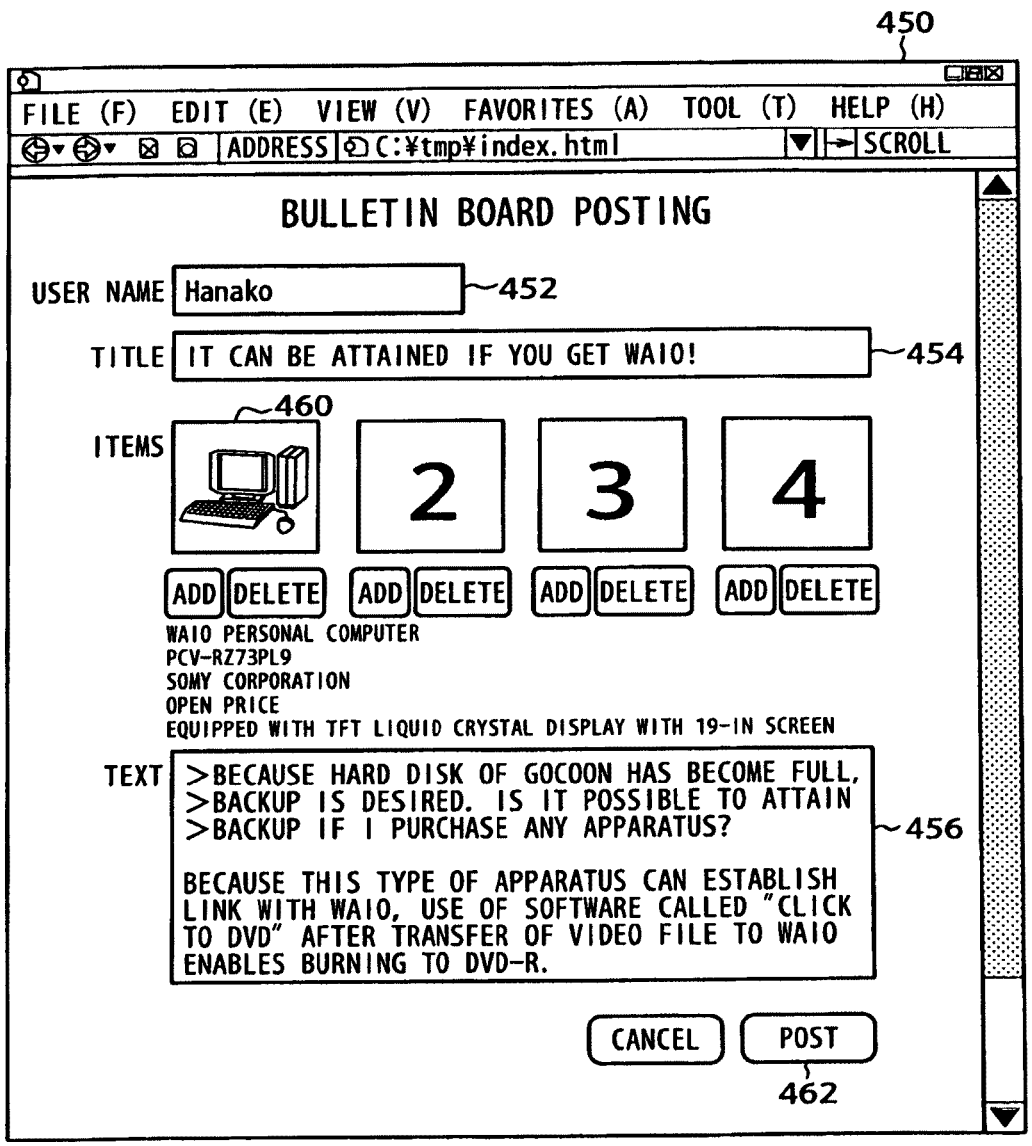
FIG. 11 is a bulletin board posting display for replying to the posting data.

FIG. 11 is a view showing a bulletin board posting display 450 available for sending a reply to the posting data. It is assumed that the reply user makes the entries of the user name "Hanako" into a user name field 452 and the title into a title field 454 on the bulletin board posting display 450 and then creates a message on a reply text field 456. Further, when the attempt is made to attach the item data also to the responsive posting data, the attachment of item data 460 to the responsive posting data is performed through the retrieval of the item data as described in the fourth embodiment. In this place, in response to a question of the earlier user who posted the posting user, the item suited to the above question is being recommended. After the confirmation of the message and the item data 460, the reply user brings the responsive posting to a completion with the touch of a "Post" button 462.

Figure 12:
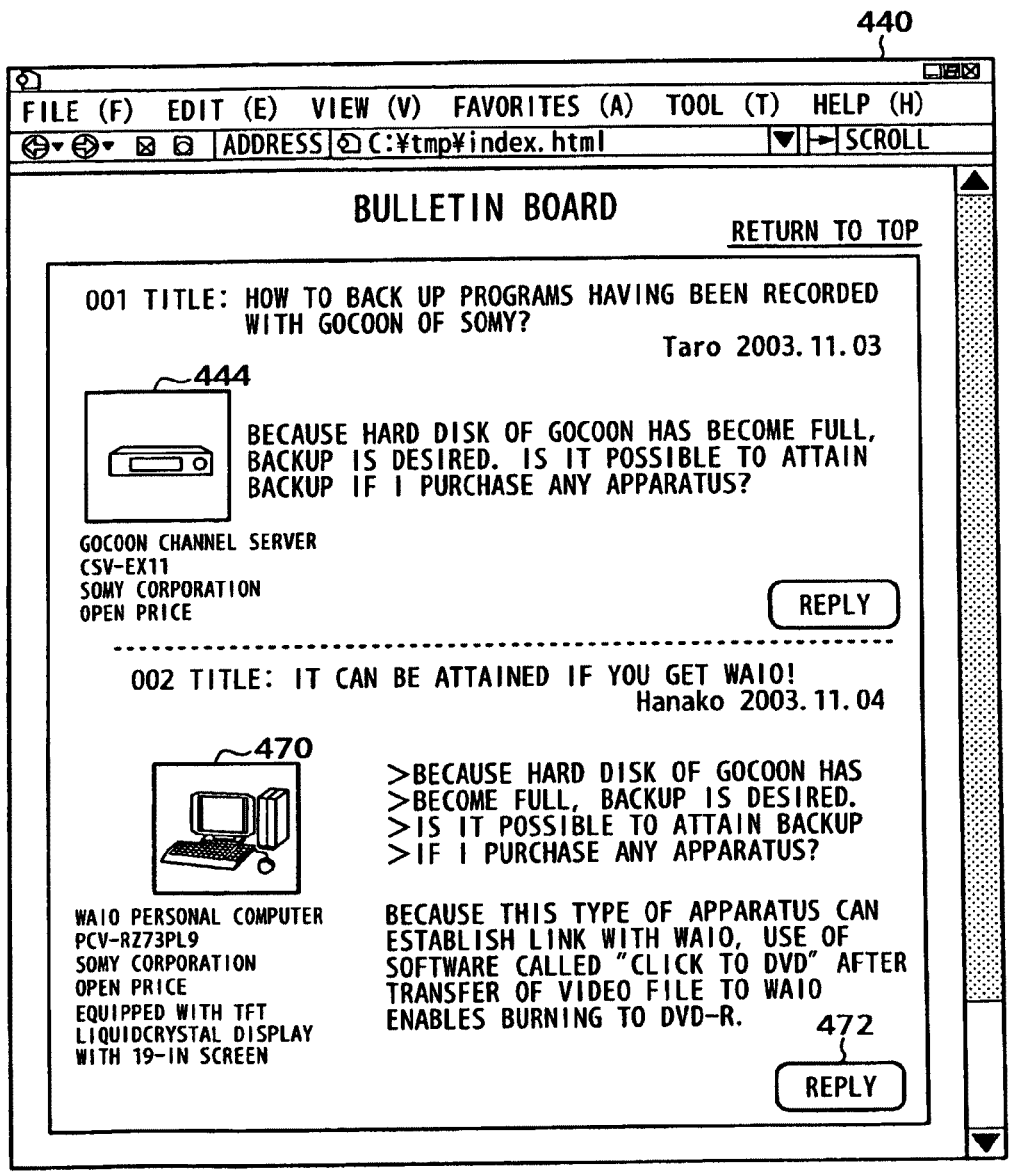
FIG. 12 is a view showing the bulletin board.

FIG. 12 is a view showing the bulletin board 440 that appears including the responsive posting data having been replied as described above. There are displayed the first posting data attached to an upper side of the display, and the responsive posting data attached to a lower side of the display so as to be placed in a "child" position located when the above first posting data is specified as "parent". On the bulletin board 440, there are also displayed the item data 444 attached to the parent posting data and item data 470 attached to the child posting data. In a case where a re-reply to the responsive posting is further required, a "Reply" button 472 is touched to call the bulletin board posting display 450.

As described above, the item data of the posting data having a "parent-to-child" relationship are judged to be those satisfying the prescribed relationship with each other, and the association of the item data with each other is performed by the relational metadata. The relational metadata generating process is described in detail in the following.

Figure 13:
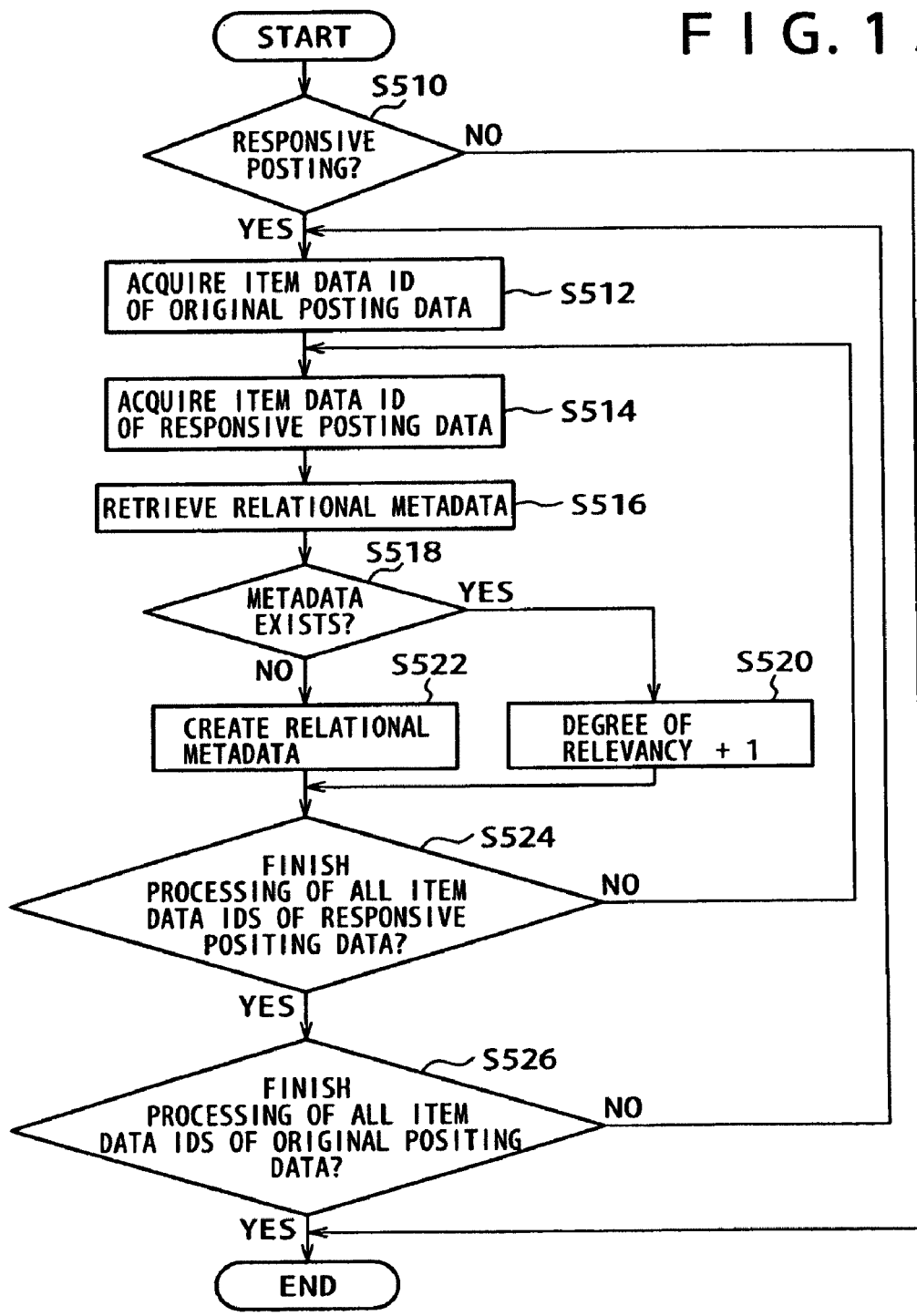
FIG. 13 is a flowchart showing a flow of a relational metadata generation process.

FIG. 13 is a flowchart showing a flow of the relational metadata generating process. Upon a reception of the posting data, the data display server 114 firstly ascertains whether or not the received posting data matches "child", more specifically, is in the form of the responsive posting (S510). In this process, the generation of the relational metadata is caused on the assumption that the two posting data bear the certain relationship with each other in a case where the posting data satisfy the relationship of "child" to "parent".

Then, one item data ID out of one or more item data IDs contained in original posting data specified as the parent posting data and one item data ID out of the item data IDs contained in the responsive posting data specified as the child posting data are acquired (Steps S512 and S514). The retrieval of the already existing relational metadata generated by associating the above two item data IDs with each other is performed (S516). In a case where the above relational metadata exists (S518), the numerical value of the degree of relevancy of the relational metadata is incremented by one (S520). In this process, the degree of relevancy is expressed in terms of an integer, and an initial value thereof is one. On the other hand, in a case where no relational metadata exists (S518), the creation of the relational metadata is newly performed (S522). A format of the relational metadata is the same as one having been already described in the third embodiment, and hence, the description thereof is omitted.

Then, it is ascertained whether or not a processing of all the item data IDs of the responsive posting data is finished (S524), and a set of the steps from S514 is repeated until non-processed item data IDs of the responsive posting data to one item data ID of the original posting data run out. Next, it is ascertained that the processing of all the item data IDs of the original posting data is finished (S526), and a set of the steps from S512 is repeated until the item data IDs of the original posting data run out. In this manner, the creation of the relational metadata is repeated by times as many as a product of the number of item data IDs contained in the original posting data and the number of item data IDs contained in the responsive posting data, that is, all conceivable combinations, resulting in the creation of omission-less relational metadata.

While the relational metadata generating process of the fifth embodiment of the present invention has described the creation of the relational metadata with the use of the "parent-to-child" relationship, it is also allowable to associate, with each other, twin-related posting data in a thread that is a smaller module capable of being activated from a single task. The degree of relevancy in this case is defined depending on an inter-posting data distance or how close the inter-posting data relationship is.

The relational metadata is not limited merely to the above "parent-to-child" and "twin-related" relationships, and a calculation of the degree of relevancy may be also performed with a degree of similarity of the independent posting data to each other. For instance, it is also allowable to apply a method of calculating an inter-document distance depending on a rate of the occurrence of words from the article contained in the posting data by means of a natural language processing etc. According to the natural language processing, the degree of relevancy may be calculated high from phrases expressive of the relationship, such as "excellent" and "optimum" contained in the article.

Furthermore, it is also allowable to perform the calculation of the degree of relevancy in consideration of reliability and influences of the user who posted the posting data. Even when the contents of the responsive posting data are the same, a prominent critic of the present item and an unspecified individual user are supposed to be different from each other in the reliability of the attached item data. Thus, the reliability of the degree of relevancy itself may be also increased by relatively adding the reliability and the influences of the user as described above to the degree of relevancy. The configuration like the above makes it possible to put restrictions on an increase of the degree of relevancy, even when the attempt to strategically establish the association with a specific item is made by a specific user.

An accumulation of the degree of relevancy, if performed simply as described above, causes an item of long standing to be expressed by a higher degree of relevancy, resulting in a failure to properly compare the degrees of relevancy with each other. However, this may be solved by an introduction of the concept of a time into the above degree of relevancy. That is, the use of a configuration of reducing or resetting the degree of relevancy with a lapse of a prescribed time causes the degree of relevancy to be updated properly

[Sixth Embodiment: Relational Data Juxtaposing Process]

The creation of the relational metadata as described above makes it possible to provide the relational data associated with the reference data by making use of the created relational metadata. The relational data provided as described above leads to a promotion of the recommendation of the item etc. for the user, thereby permitting the user not only to confirm the product information of the reference data but also to browse the items closely related to the reference data. The above relational data is referred to at the time when, with reference to all the displays adapted to the display of the reference data at the retrieval time etc., the attempt is made to confirm the product information of the displayed reference data.

Figure 14:
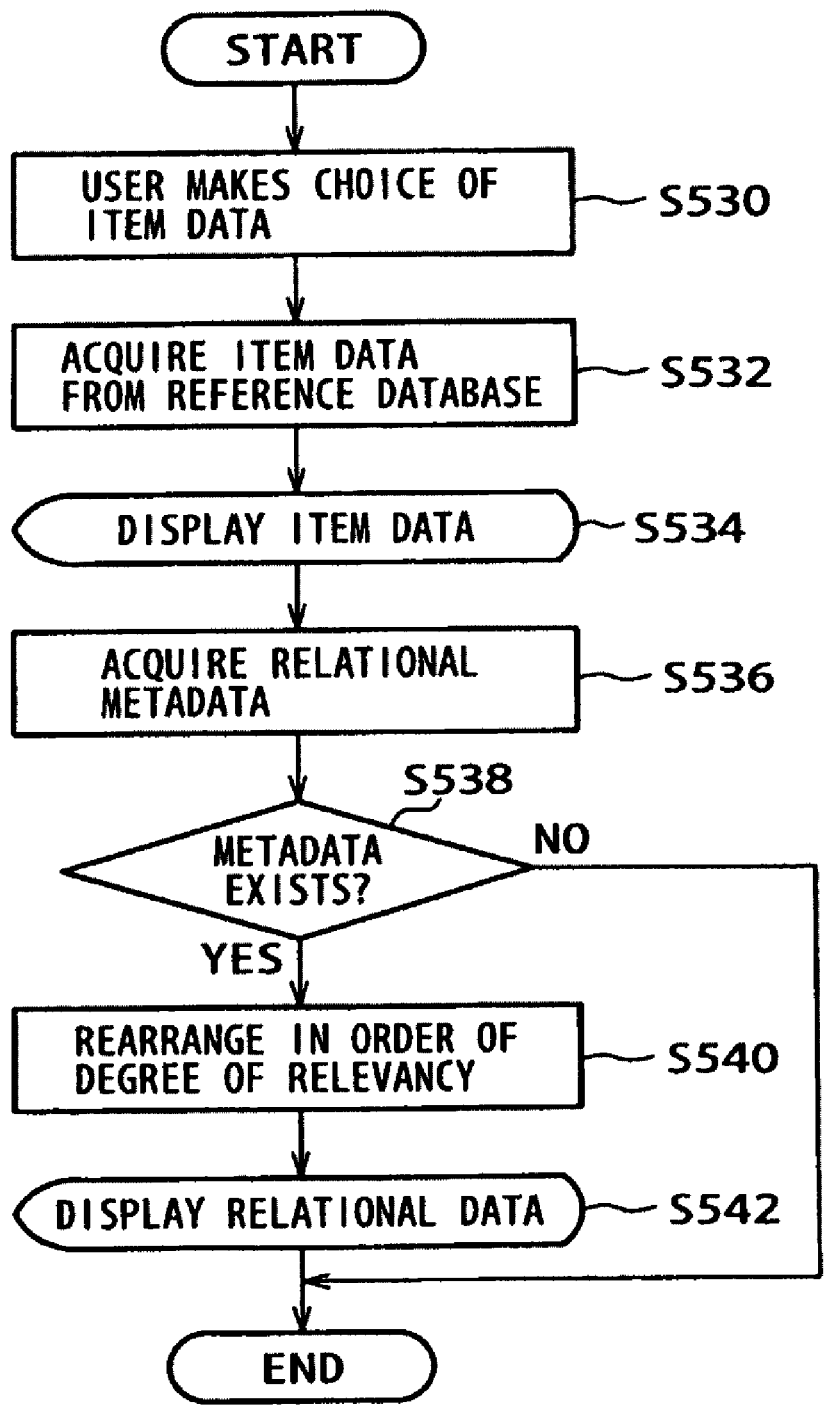
FIG. 14 is a flowchart showing a flow of a relational data juxtaposing process.

FIG. 14 is a flowchart showing a flow of the relational data juxtaposing process. The user makes a choice of the item data (S530) with a click of the item data 444 on the bulletin board 440 shown in FIG. 10, for instance, for the detailed browsing of the item data attached to the posting data. In response to the above choice, the data display server 114 acquires the item data 444 from the reference database 132 (S532). The details of the item data 444 having been acquired in this manner are displayed at an upper side of the product information display (S534).

Then, the data display server 114 attempts to acquire the relational metadata containing the item data ID of the item data 444 from the relational database 152 (S536), and in a case where plural pieces of relational metadata exist (S538), rearranges the relational data depending on the degree of relevancy of the relational metadata (S540), and the rearranged relational data are displayed at a lower side of the item data 444, that is, a lower side of the product information display (S542).

Figure 15:
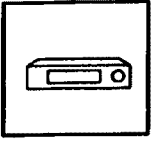
FIG. 15 is a view showing a product information display.

FIG. 15 is a view showing a product information display 544 that appears by the relational data juxtaposing process. On this display, there is displayed product information including detailed information 546 of the item data 444 attached to the posting data and relational data 548 associated with the item data 444. The reference to the product information permits the user to obtain not only the item data 444, but also the associated item data having the strong relationship given by making use of the relational metadata and also being more persuasive to the user.

[Modification 1: Type of Relationship]

While the relational data juxtaposing means 156 employs the relational data display order determined depending on only the degree of relevancy of the relational metadata, the display order is further allowable to be defined with reference to a type of relationship.

The user is permitted to select the type of relationship among prescribed relationships. The above relationships are supposed to include a way to use the reference data, a function, an effect, a combination, similarity, a purchase history and other various relations.

Figure 16:
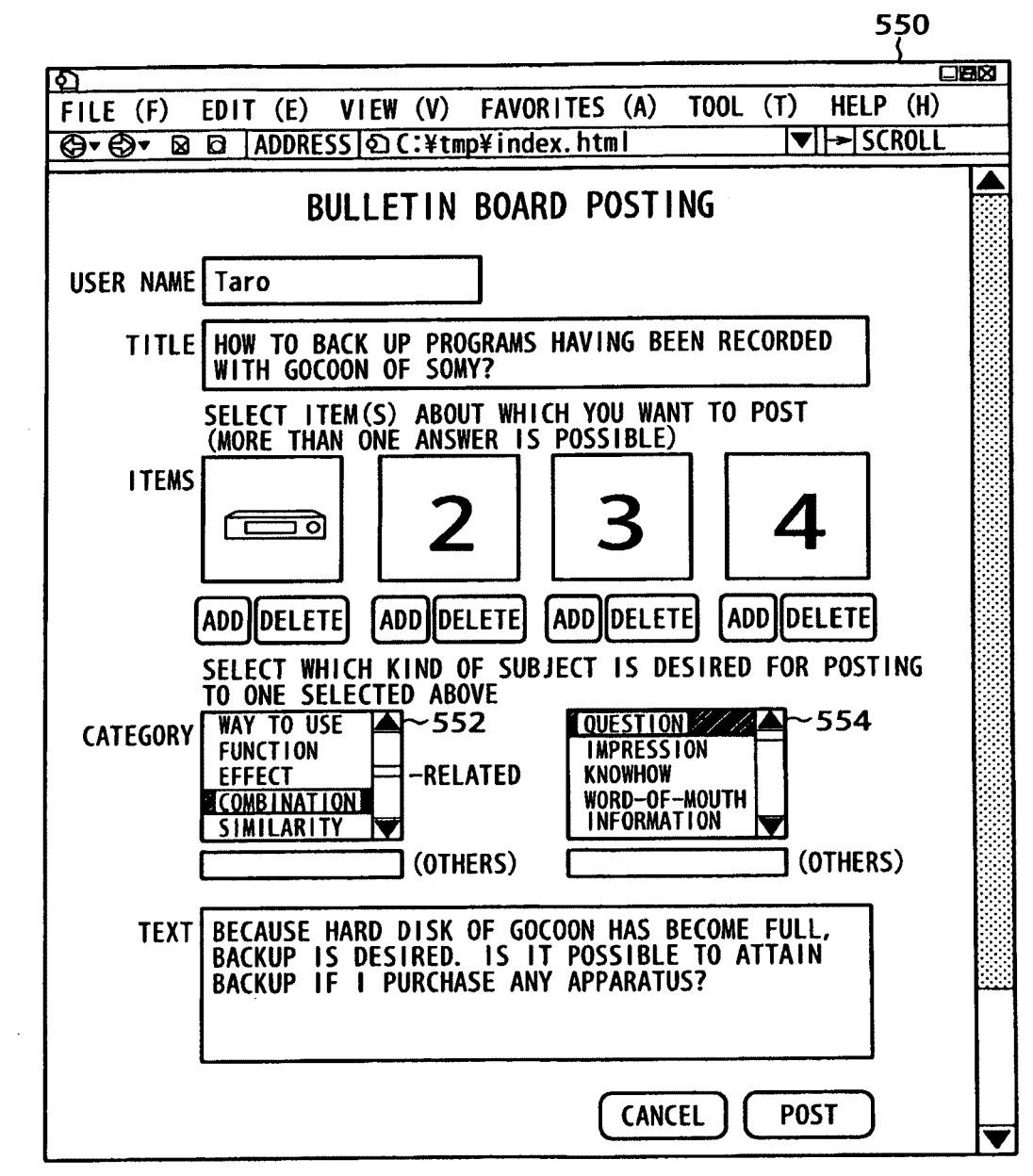

FIG. 16 shows a bulletin board posting display 550 further available for the selection of the type of relationship. In this case, it is assumed that the user who posted the posting gives a question about the combination on the attached item. Thus, after the selection of "Combination" as a rough item from a relation type field 552, "Question" is further being selected from a detailed relation field 554.

The above type of relationship is used for a rearrangement of the relational data individually or in cooperation with the above degree of relevancy. The user may set at will depending on the user's taste whether the relational data should be arranged on the product information display in the descending order of the degree of relevancy or according to the type of relationship at the time of the browsing of the posting data.

Figure 17:
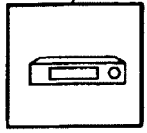
FIG. 17 is a view showing a product information display.

FIG. 17 is a view showing a product information display 540 that appears in a case of the parallel entry of the relational data depending on the type of relationship. In this display, there are displayed item data 562 and 564. The item data 562 is the relational data having a relationship in a combination with the item data 444, and the item data 564 is the relational data having a relationship in similarity to the item data 444.

(Modification 2: Data Display Server 114)

Figure 18:
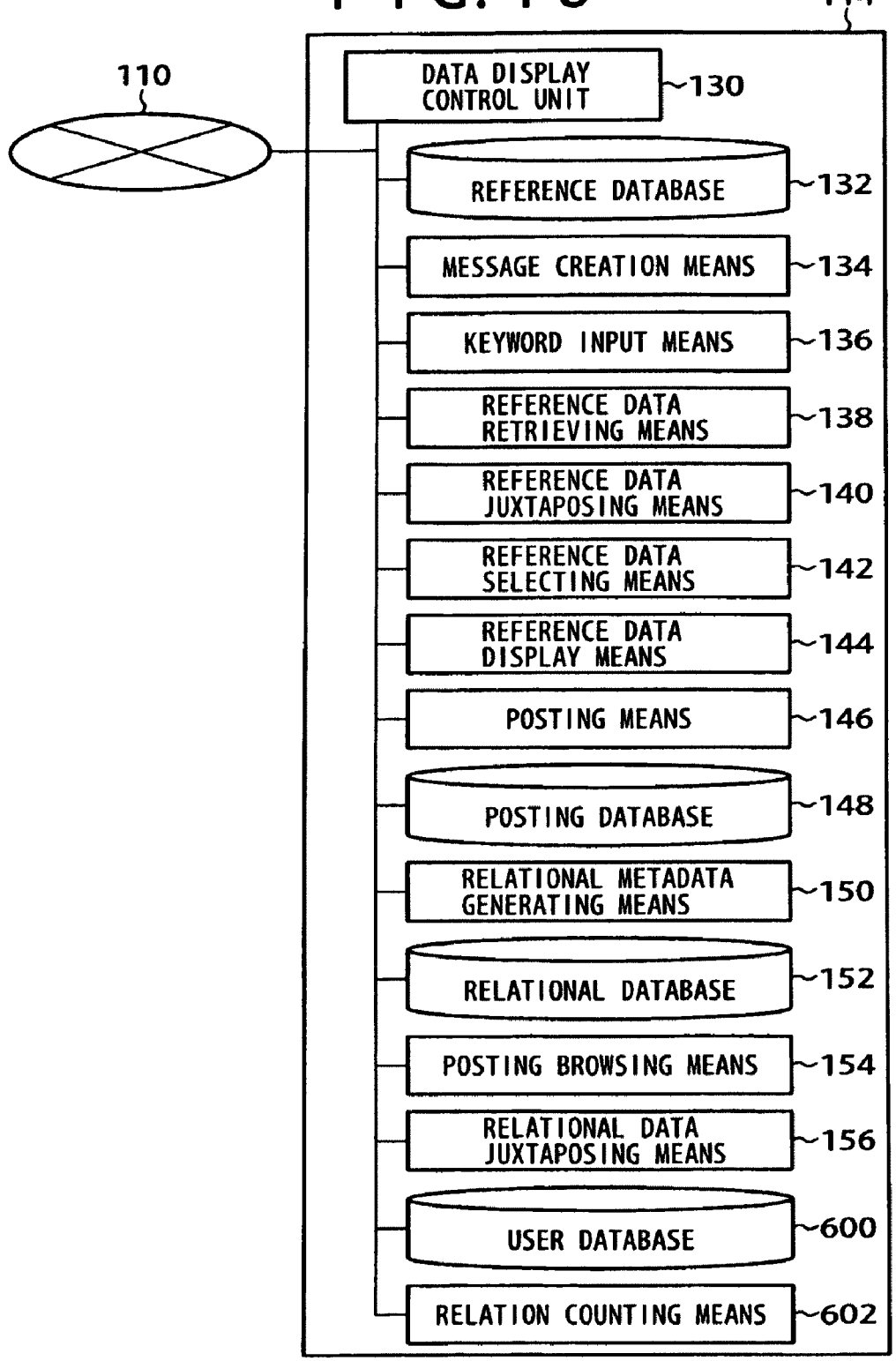
FIG. 18 is a block diagram showing a structure of a data display server according to a modified example 2.

FIG. 18 is a block diagram showing the configuration of the data display server 114 in a modification of the present invention. The above data display server 114 is composed of the data display control unit 130, the reference database 132, the message creating means 134, the keyword input means 136, the reference data retrieving means 138, the reference data juxtaposing means 140, the reference data selecting means 142, the reference data display means 144, the posting means 146, the posting database 148, the relational metadata generating means 150, the relational database 152, the posting browsing means 154, the relational data juxtaposing means 156, a user database 600 and a relation counting means 602.

The duplicate description of the components having the substantially same function as those having already been described with reference to the data display server 114 in the second embodiment is omitted, and this section mainly describes the reference database 132 having a different configuration, the user database 600 and the relation counting means 602.

The reference database 132 holds category data of the reference data, together with the reference data. This is for the purpose of facilitating the data management by classifying each reference data, in particular, the item data and the service data for each category and further by layering the category itself.

The user database 600 holds the user data specified as personal information of the user. The user database 600 is effective in providing more useful information for the user in cooperation with the relational database 152. Further, the information of the posting data may be reflected in the user data.

The relation counting means 602 counts the relational metadata containing the two reference data IDs equal to each other. In a case where the identical relational metadata exists, the above relational metadata generating process increments the degree of relevancy of the identical relational metadata, and generates no further identical relational metadata. In the modification of the present invention, even if the identical relational metadata exists, new relational metadata is created. Then, whenever the relational data juxtaposing process is carried into execution, a counting of the relational metadata is performed with the relation counting means 602, and a count value is treated as the degree of relevancy. A configuration requiring no deletion of the relational metadata as described above makes it possible to individually examine the reason for the relationship with reference to the reference data.

Figure 19:
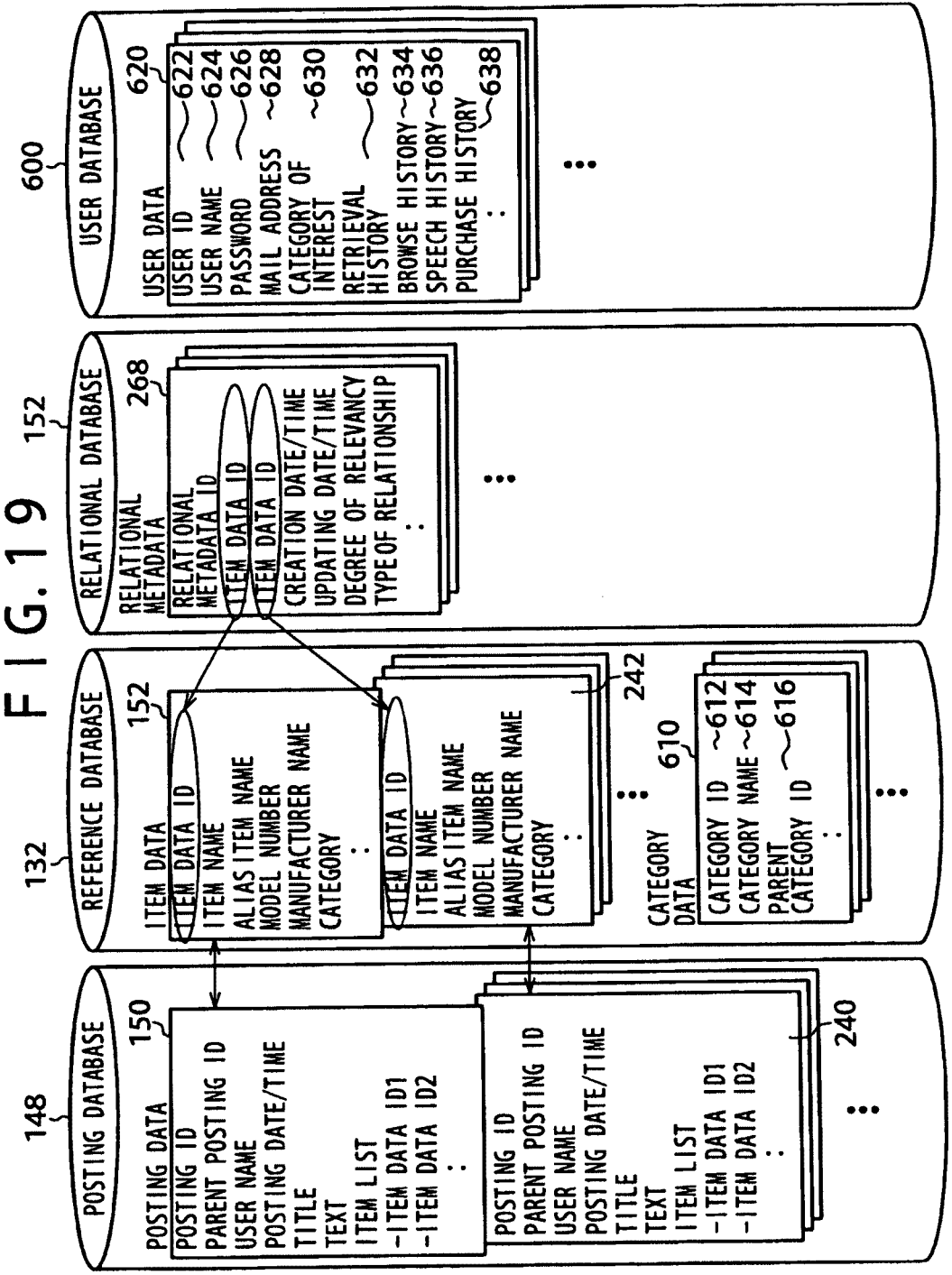
FIG. 19 is a structural view showing a structure of a database in the data display server of the modified example 2.

FIG. 19 is a view showing a database structure in the data display server 114 of the modification of the present invention. In this section, the duplicate description on the configuration having been described in the second embodiment is also omitted.

The reference database 132 is newly provided with category data 610. The category data 610 contains a category ID 612, a category name 614 and a parent category ID 616. The category ID 612 is an ID of a present category, and the category name 614 is a name of the category. The parent category ID 616 is an ID of a parent category equivalent to a higher-order concept of the present category. The parent category ID 616 causes the category to be layered. The category data 610 described the above makes it possible to facilitate the management of the item data.

The data display server 114 may also have the user database 600. The user database 600 is supposed to hold user data 620 containing the personal information of the user. The user data 620 is composed of a user ID 622, a user name 624, a password 626, a mail address 628, a category of interest 630, a retrieval history 632, a browse history 634, a posting history 636 and a purchase history 638. The user ID 622 is an ID of a registered user, and the user name 624 is a name of the registered user. The password 626 is a password required together with the user ID 622 for the user to log in, and the mail address 628 is used to give information etc. to the user. The category of interest 630 is directly used to extract the relational data, and each of the retrieval history 632, the browse history 634, the posting history 636 and the purchase history 638 is used to narrow down the relational data.

Figure 20:
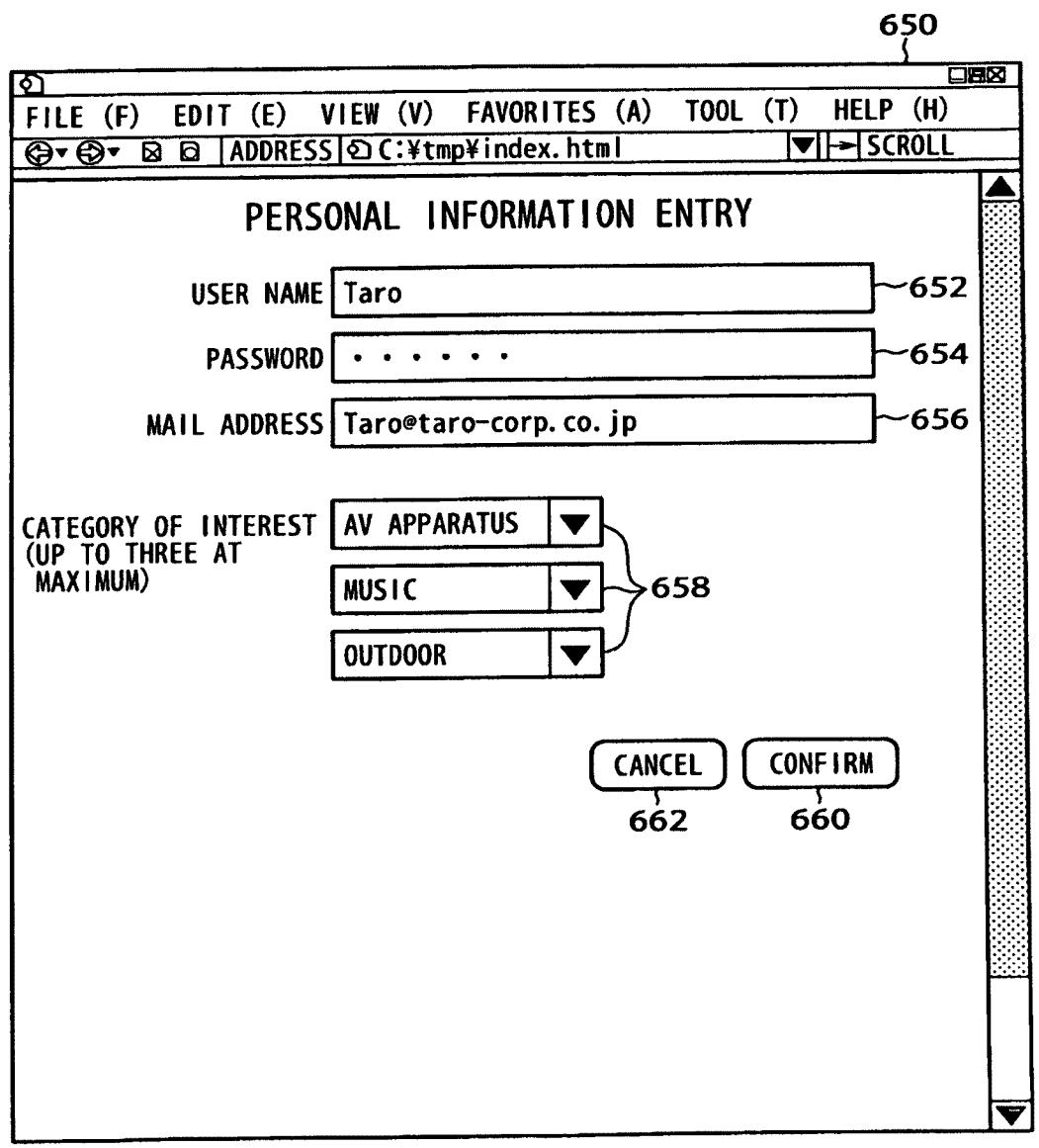
FIG. 20 is a view showing a personal information inputting display.

FIG. 20 is a view showing a personal information entry display 650 available for the creation of the above user data. The user makes the entries of the user name "Taro" into a user name field 652, a personal password of the user into a password field 654 and an e-mail address into a mail address field 656 and sets a category of interest up to three at maximum in a category field 658. After the confirmation of the set contents, a user's registration is performed by touching a "Determine" button 660. It is also allowable to cancel the registration by touching a "Cancel" button 662.

A process of rearranging the relational data by making use of the above user data 620 is now described.

Figure 21:
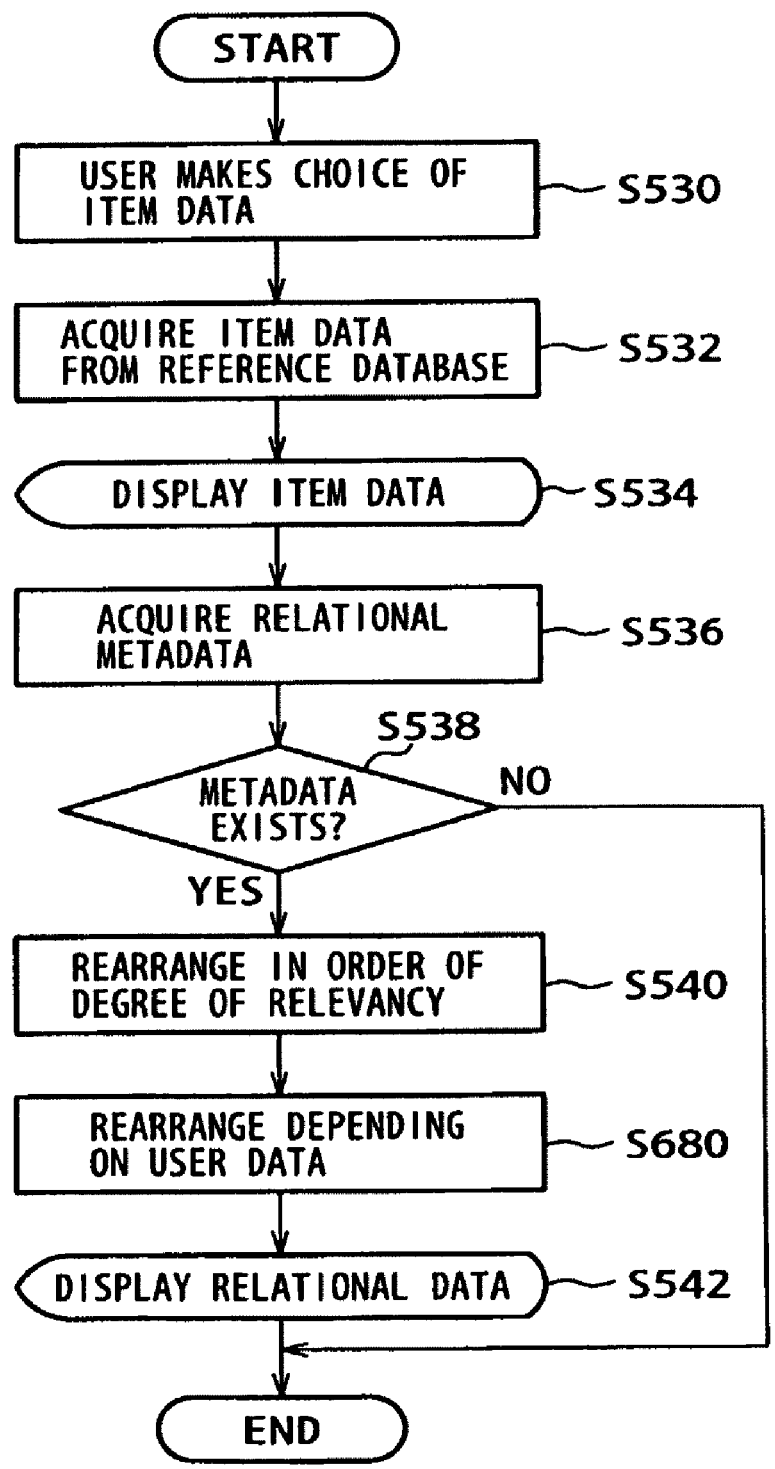
FIG. 21 is a flowchart showing a flow of a relational data juxtaposing process according to the modified example 2.

FIG. 21 is a flowchart showing a flow of the relational data juxtaposing process according to the modification of the present invention. In this section, the duplicate description on the processes having been described in the sixth embodiment is omitted.

In a case where the relational metadata exists (S538), the rearrangement of the relational data depending on the degree of relevancy of the relational metadata is once performed (S540). Then, the rearrangement of the relational data in the certain order suited to the user's taste is further performed according to the user data 620 of the user who finishes making the reference to the posting (S680). The relational data are displayed in the rearranged order as described above (S542). The priority order, that is, the arrangement order of the relational data is changed by the user who is browsing the posting as described above.

FIG. 22 is a view showing a product information display 544 that appears in a case of the display of the relational data with the user data 620 reflected. It is assumed that "Taro" who finishes the user registration in FIG. 20 is selecting "AV apparatus", "Music" and "Outdoor" as the categories of interest. Thus, as compared with the product information display 544 of FIG. 17 in which the priority order of the relational data is determined only depending on the degree of relevancy, item data 690 is newly added as "Recommendable item for Mr. Taro" to ensure that the service more suited to the taste of the user "Taro" is provided.

While the preferred embodiments of the present invention have been described with reference to the accompanying drawings, it is to be understood that the present invention is not limited to the above embodiments. It is also to be understood that various modifications or changes will be apparent to those skilled in the art without departing from the scope of the invention as defined in claims, and that these modifications or changes fall within technical bounds of the present invention as a matter of course.

While the above embodiments have described the data display system and the data display method by giving the user terminal and the data display server, for instance, the present invention is not limited to the above form, and it is also supposed that there are provided in the form of an application in one terminal.

Further, while the confirmation of the product information of the reference data attached to the posting data is given as the instance in which the relational data is displayed, the present invention is not limited to the posting data, and it is also allowable to, when the user performed the retrieval of a specific item by making use of a retrieval site on the Internet, display related items specified as the relational data derived by the relational metadata together with the retrieved specific item. The relational metadata or the relational data is supposed to be available in various methods.

Furthermore, while in the above description of the embodiments, the number of the reference data IDs contained in the relational metadata is limited to two, it is also allowable to give the definition of the relational metadata containing three or more reference data IDs depending on the purpose of providing the service. In addition to the above item data or service data, various data which can be referred to data including those about general estate such as land or marine and intangible assets such as music may be also applied to the reference data described the above.

The present invention is capable of being applied to the data display server that performs the display of the prescribed data by making use of the inter-data relationship, and also to the data display method and the program thereof.

What is claimed:
1. A method, comprising:
generating, with a processor of a server, first relational data based on electronic bulletin board content received from one or more user terminals, the generating including
receiving the electronic bulletin board content including reference data corresponding to a first sale item selected from a plurality of predetermined sale items at one of the one or more user terminals, and reference data corresponding to a second sale item selected from the plurality of predetermined sale items at one of the one or more user terminals,
extracting, from the electronic bulletin board content received from the one or more user terminals, the reference data corresponding to the first sale item and the reference data corresponding to the second sale item,
associating the reference data of the first sale item with the reference data of the second sale item based on a relationship between the first sale item and the second sale item described in the electronic bulletin board content received from the one or more user terminals, and
storing the association as the first relational data in a relational database; and generating purchase recommendation information recommending the purchase of at least one of the first sale item and the second sale item based on the generated first relational data, wherein the first relational data includes a degree of relevancy metric, the method further comprising generating additional relational data;

determining whether any of the additional relational data corresponds to the first sale item and second sale item;

increasing the degree of relevancy metric of the first relational data for each of the additional relational data determined to correspond to the first sale item and second sale item; and deleting each of the additional relational data determined to correspond to the first sale item and second sale item after increasing the degree of relevancy metric of the first relational data, and the relationship between the first sale item and the second sale item includes a relationship based on function, effect, compatibility, shape, or prior purchase history.

2. The method of claim 1, wherein the first relational data includes data identifying the relationship between the first sale item and the second sale item, and the method further comprises:

juxtaposing and configuring for display on a user terminal the reference data of the first sale item and relational data identifying the second sale item, the relational data being associated with the reference data of the first sale item and identifying the relationship between the first sale item and the second sale item.

3. The method of claim 2, wherein the reference data corresponding to the first sale item and second sale item include category data.

4. The method according to claim 2, wherein the relational data is configured to be displayed by the user terminal according to the degree of relevancy from most relevant to least relevant with respect to the first sale item.

5. The method according to claim 2, wherein the relational data is configured to be displayed by the user terminal in an order based on user data.

6. The method according to claim 2, wherein the relational data is configured to be displayed by the user terminal in an order according to the relationship between the first sale item and the second sale item.

7. The method according to claim 1, wherein the electronic bulletin board content received from one or more user terminals includes the item data IDs of the first sale item and second sale item.

8. The method according to claim 1, further comprising:

outputting the generated purchase recommendation information to at least one of the user terminals.

9. The method according to claim 1, wherein receiving the electronic bulletin board information includes receiving the relationship between the first sale item and the second sale item selected from a plurality of predetermined relationships at one of the one or more user terminals.

10. A non-transitory computer readable storage medium storing computer readable instructions thereon, which, when executed by a computer, cause the computer to perform a method comprising:

generating, with a processor of a server, first relational data based on electronic bulletin board content received from one or more user terminals, the generating including receiving the electronic bulletin board content including reference data corresponding to a first sale item selected from a plurality of predetermined sale items at one of the one or more user terminals, and reference data corresponding to a second sale item selected from the plurality of predetermined sale items at one of the one or more user terminals, extracting, from the electronic bulletin board content received from the one or more user terminals, the reference data corresponding to the first sale item and the reference data corresponding to the second sale item, associating the reference data of the first sale item with the reference data of the second sale item based on a relationship between the first sale item and the second sale item described in the electronic bulletin board content received from the one or more user terminals, and storing the association as the first relational data in a relational database; and generating purchase recommendation information recommending the purchase of at least one of the first sale item and the second sale item based on the generated first relational data, wherein the first relational data includes a degree of relevancy metric, the method further comprises generating additional relational data;

determining whether any of the additional relational data corresponds to the first sale item and second sale item;

increasing the degree of relevancy metric of the first relational data for each of the additional relational data determined to correspond to the first sale item and second sale item; and deleting each of the additional relational data determined to correspond to the first sale item and second sale item after increasing the degree of relevancy metric of the first relational data, and the relationship between the first sale item and the second sale item includes a relationship based on function, effect, compatibility, shape, or prior purchase history.

* * * * *